United States Patent
Chien

(10) Patent No.: US 11,209,990 B2
(45) Date of Patent: Dec. 28, 2021

(54) APPARATUS AND METHOD OF ALLOCATING DATA SEGMENTS IN STORAGE REGIONS OF GROUP OF STORAGE UNITS

(71) Applicant: SUPER MICRO COMPUTER, INC., San Jose, CA (US)

(72) Inventor: Hung-Ming Chien, Hsinchu County (TW)

(73) Assignee: SUPER MICRO COMPUTER, INC., San Jose, CA (US)

(*) Notice: Subject to any disclaimer, the term of this patent is extended or adjusted under 35 U.S.C. 154(b) by 24 days.

(21) Appl. No.: 16/354,803

(22) Filed: Mar. 15, 2019

(65) Prior Publication Data
US 2020/0293201 A1    Sep. 17, 2020

(51) Int. Cl.
*G06F 3/06* (2006.01)
*G06F 11/10* (2006.01)

(52) U.S. Cl.
CPC .......... *G06F 3/0619* (2013.01); *G06F 3/0611* (2013.01); *G06F 3/0629* (2013.01); *G06F 3/0689* (2013.01); *G06F 11/1092* (2013.01)

(58) Field of Classification Search
CPC .. G06F 3/0619; G06F 3/0689; G06F 11/1092; G06F 3/0629; G06F 3/0611;
(Continued)

(56) References Cited

U.S. PATENT DOCUMENTS 5,265,098 A * 11/1993 Mattson .............. G06F 11/1008
714/6.12
5,754,756 A *  5/1998 Watanabe ........... G06F 11/1076
711/114

(Continued)

OTHER PUBLICATIONS

The RAIDBook by Paul Massiglia, Sixth Edition, The RAID Advisory Board, Feb. 1997. (Year: 1997).*

(Continued)

*Primary Examiner* — Hong C Kim
(74) *Attorney, Agent, or Firm* — WPAT, P.C., Intellectual Property Attorneys; Anthony King

(57) ABSTRACT

An apparatus including a control unit, a memory having computer program code, and N groups of storage units electrically connected to the control unit is disclosed. Each of the N groups of storage units has N storage units, each of the N storage units has N storage regions, wherein N is a positive integer. The memory and the computer program code configured to, with the control unit, cause the apparatus to perform: storing a first data segment into an $i^{th}$ storage region of a first storage unit of a $k^{th}$ group of storage units; storing a fourth data segment into an $i^{th}$ storage region of a first storage it of a $(k+1)^{th}$ group of storage units; storing a fifth data segment into an $i^{th}$ storage region of a second storage unit of the $(k+1)^{th}$ group of storage units; and storing a sixth data segment into an $i^{th}$ storage region of a third storage unit of the $(k+1)^{th}$ group of storage units. Wherein the first data segment is associated with the fourth data segment, the first data segment is independent of the fifth data segment, and the first data segment is independent of the sixth data segment.

22 Claims, 23 Drawing Sheets

(58) Field of Classification Search
CPC ...... G06F 3/0683; G06F 3/065; G06F 3/0604; G06F 12/0246; G06F 11/1458; G06F 11/1004; G06F 11/1076
USPC .......................................... 711/114; 714/6.22
See application file for complete search history.

(56) References Cited

U.S. PATENT DOCUMENTS

| | | | | |
|---|---|---|---|---|
| 7,062,604 | B1* | 6/2006 | Nanda | G06F 11/1076 711/114 |
| 2006/0294303 | A1* | 12/2006 | Shimoi | G06F 3/0635 711/114 |
| 2007/0028044 | A1* | 2/2007 | Hetrick | G06F 3/0689 711/114 |
| 2011/0185119 | A1* | 7/2011 | Madpuwar | G06F 11/108 711/114 |
| 2011/0289261 | A1* | 11/2011 | Candelaria | G06F 11/2089 711/103 |
| 2014/0317346 | A1* | 10/2014 | Moon | G06F 3/0665 711/114 |
| 2016/0062835 | A1* | 3/2016 | Kozawa | G06F 11/1088 714/764 |
| 2017/0242752 | A1* | 8/2017 | Lee | G06F 3/0689 |
| 2019/0317889 | A1* | 10/2019 | Chang | G06F 12/023 |
| 2020/0250036 | A1* | 8/2020 | Zhang | G06F 11/1076 |

OTHER PUBLICATIONS https://www.thegeekstuff.com/2011/10/raid10-vs-raid01/,Ramesh Natarajan on Oct. 24, 2011, The Geek Stuff, Raid 10 Vs RAID 01 (RAID 1+0 Vs RAID 0+1) Explained with Diagram (Year: 2011).* https://en.wikipedia.org/w/index.php?title=Standard_RAID_levels&oldid=886307037, Wikipedia, Standard RAID levels, Mar. 5, 2019 (Year: 2019).* https://en.wikipedia.org/w/index.php?title=Nested_RAID_levels&oldid=859357813, Wikipedia, Nested RAID levels, Sep. 13, 2018 (Year: 2018).* https://en.wikipedia.org/w/index.php?title=Non-standard_RAID_levels&oldid=887644842, Wikipedia, Non-standard RAID levels, Mar. 13, 2019 (Year: 2019).*

Zhang, Guangyan et al., RAID+: Deterministic and Balanced Data Distribution for Large Disk Enclosures, USENIX Association, 16th USENIX Conference on File and Storage Technologies, pp. 279-293.

* cited by examiner

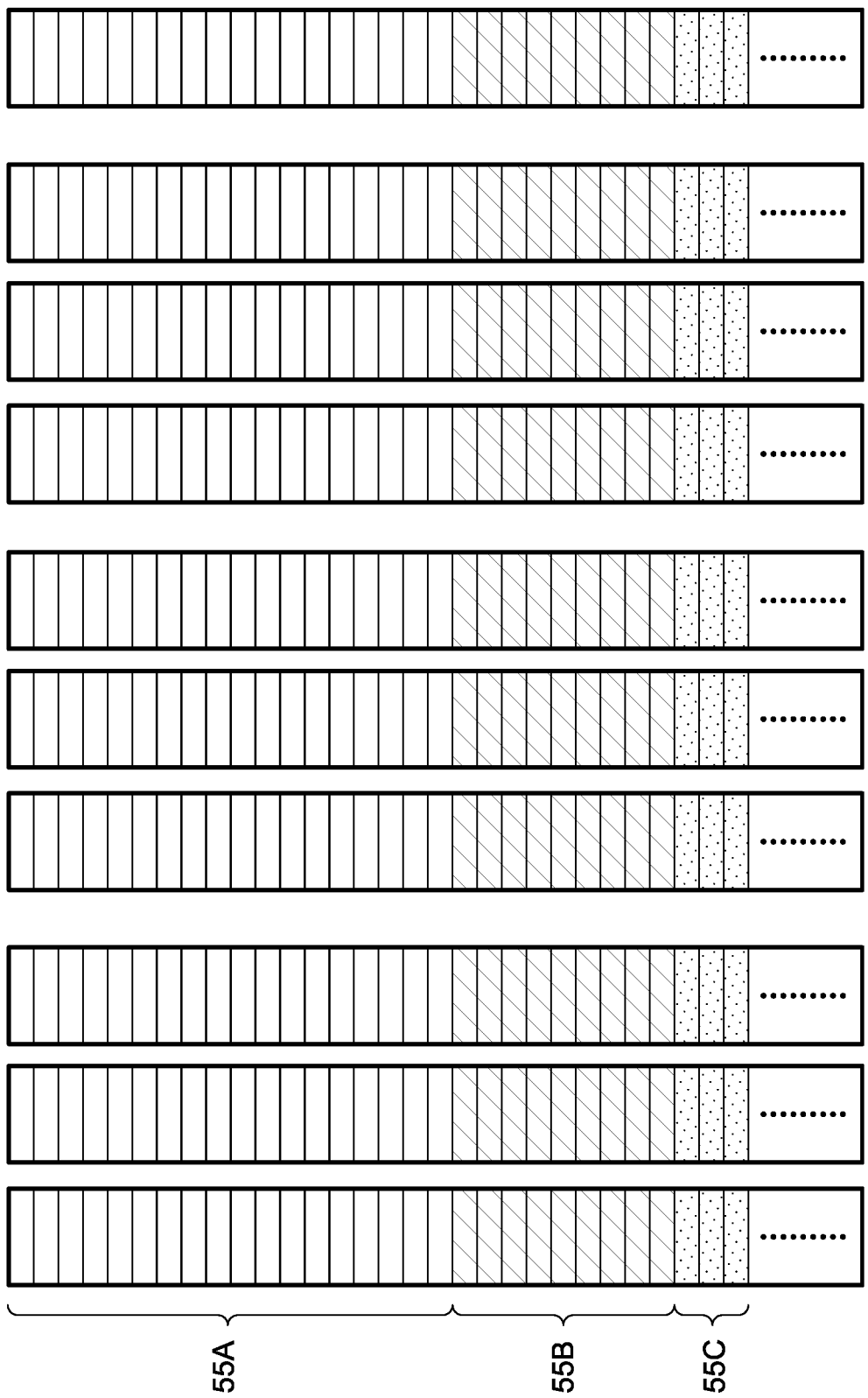

APPARATUS AND METHOD OF ALLOCATING DATA SEGMENTS IN STORAGE REGIONS OF GROUP OF STORAGE UNITS

TECHNICAL FIELD

The subject application generally relates to storage space management, and specifically relates to an apparatus and method of automatic configuration of storage space.

BACKGROUND

Some solutions were developed to provide a safe data storage. However, as technology progresses, security of data or files (or backup of data) becomes a critical issue.

SUMMARY

A new data allocation mechanism is proposed. The storage units in an array are categorized as several groups. The data to be stored in the storage units are arranged in a specific manner so that the rebuilding work for one failed storage unit of one group can be shared by the storage units of the other groups. Specifically, the data to be stored in the storage units are arranged according to mutually orthogonal Latin squares so that specific data on a storage unit of one group can be rebuilt using the data stored in only one storage unit from each of the other groups. This can increase the speed of rebuilding the data stored in a failed storage unit. In addition, a new data allocation mechanism is proposed to improve the capacity efficiency of an array of storage units based on the expansion of mutually orthogonal Latin squares.

In accordance with some embodiments of the present disclosure, an apparatus is disclosed. The apparatus includes a control unit, a memory having computer program code, and N groups of storage units electrically connected to the control unit. Each of the N groups of storage units has N storage units, each of the N storage units has N storage regions, wherein N is a positive integer. The memory and the computer program code configured to, with the control unit, cause the apparatus to perform: (1) storing a first data segment into an $i^{th}$ storage region of a first storage unit of a $k^{th}$ group of storage units; (2) storing a second data segment into $i^{th}$ storage region of a second storage unit of the $k^{th}$ group of storage units; (3) storing a third data segment into an $i^{th}$ storage region of a third storage unit of the $k^{th}$ group of storage units; (4) storing a fourth data segment into an $i^{th}$ storage region of a first storage unit of a $(k+1)^{th}$ group of storage units; (5) storing a fifth data segment into an $i^{th}$ storage region of a second storage unit of the $(k+1)^{th}$ group of storage units; and (6) storing a sixth data segment into an $i^{th}$ storage region of a third storage unit of the $(k+1)^{th}$ group of storage units. Where i is a positive integer less than or equal to N, where k is a positive integer less than or equal to N. Wherein the first data segment is associated with the fourth data segment, the first data segment is independent of the fifth data segment, and the first data segment is independent of the sixth data segment.

An apparatus in accordance with some embodiments of the present disclosure is disclosed. The apparatus includes a control unit, a memory coupled to control and including computer program code, and S groups of storage units electrically connected to the control unit. A $1^{st}$ group of storage units to the $(S-1)^{th}$ group of storage units each has N storage units, the $S^{th}$ group of storage units has M storage units. Each storage units of the S group of storage units has N storage regions, wherein N, S and M are positive integers. S and M are less than N. The memory and the computer program code configured to, with the control unit, cause the apparatus to perform: (1) storing a first data segment into an $i^{th}$ storage region of a first storage unit of a $k^{th}$ group of storage units; (2) storing a second data segment into an $i^{th}$ storage region of a second storage unit of the $k^{th}$ group of storage units; (3) storing a third data segment into an $i^{th}$ storage region of a third storage unit of the $k^{th}$ group of storage units; (4) storing a fourth data segment into an $i^{th}$ storage region of a first storage unit of the $S^{th}$ group of storage units; (5) storing a fifth data segment into an $i^{th}$ storage region of a second storage unit of the $S^{th}$ group of storage units, and (6) storing a sixth data segment into an $i^{th}$ storage region of a third storage unit of the $S^{th}$ group of storage units. Where i is a positive integer less than or equal to N, where k is a positive integer less than or equal to N. Wherein the first data segment is associated with the fourth data segment, the first data segment is independent of the fifth data segment, and the first data segment is independent of the sixth data segment.

In accordance with some embodiments of the present disclosure, a method for storing data in a storage system is disclosed. The storage system has N groups of storage units each having N storage units. Each storage unit of the N group of storage units has N storage regions, wherein N is a positive integer. The method comprising: (1) storing a first data segment into an $i^{th}$ storage region of a first storage unit of a $k^{th}$ group of storage units; (2) storing a second data segment into an $i^{th}$ storage region of a second storage unit of the $k^{th}$ group of storage units; (3) storing a third data segment into an $i^{th}$ storage region of a third storage unit of the $k^{th}$ group of storage units; (4) storing a fourth data segment into an $i^{th}$ storage region of a first storage unit of a $(k+1)^{th}$ group of storage units; (5) storing a fifth data segment into an $i^{th}$ storage region of a second storage unit of the $(k+1)^{th}$ group of storage units; and (6) storing a sixth data segment into an $i^{th}$ storage region of a third storage unit of the $(k+1)^{th}$ group of storage units. Where i is a positive integer less than or equal to N, where k is a positive integer less than or equal to N. Wherein the first data segment is associated with the fourth data segment, the first data segment is independent of the fifth data segment, and the first data segment is independent of the sixth data segment.

BRIEF DESCRIPTION OF THE DRAWINGS

Aspects of the present disclosure are readily understood from the following detailed description when read with the accompanying figures. It is noted that various features may not be drawn to scale, and the dimensions of the various features may be arbitrarily increased or reduced for clarity of discussion.

FIG. 5B is a schematic diagram illustrating a storage space configuration according to some embodiments of the subject application.

FIG. 5E is a schematic diagram illustrating a storage space configuration according to some embodiments of the subject application.

FIG. 5H is a schematic diagram illustrating a storage space configuration according to some embodiments of the subject application.

FIG. 5J is a schematic diagram illustrating a storage space configuration according to some embodiments of the subject application.

FIG. 6A is a schematic diagram illustrating a storage space configuration according to some embodiments of the subject application.

FIG. 7 is a schematic diagram illustrating data allocation portfolio according to some embodiments of the subject application.

FIG. 7A is a schematic diagram illustrating data allocation portfolio according to some embodiments of the subject application.

FIG. 8C is a schematic diagram illustrating a storage space configuration according to some embodiments of the subject application.

DETAILED DESCRIPTION

Figure 1:
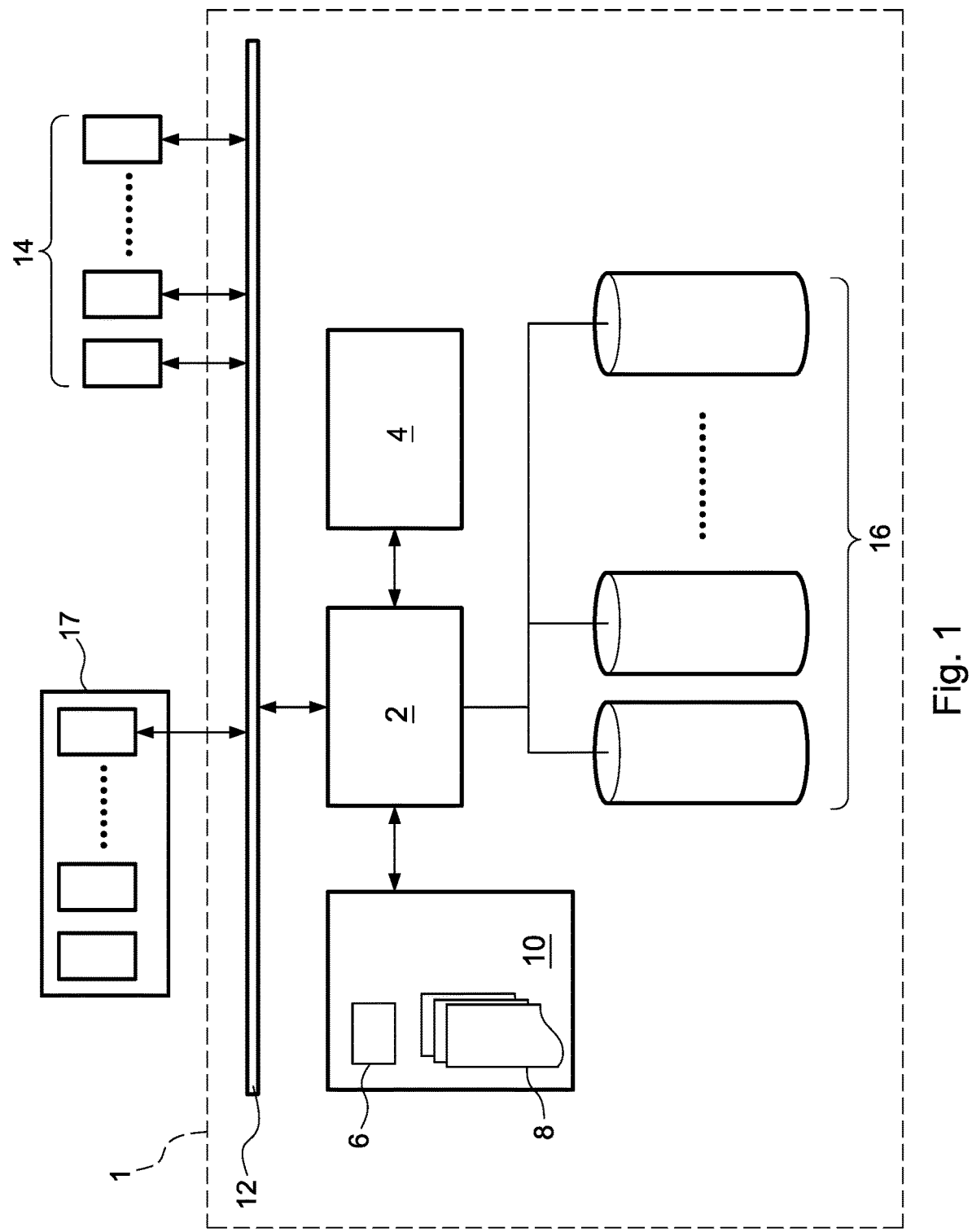
FIG. 1 is a schematic diagram illustrating an apparatus according to some embodiments of the subject application.

Embodiments of the present disclosure and use thereof are discussed in detail below. It should be appreciated, however, that the embodiments set forth many applicable concepts that can be embodied in a wide variety of specific contexts. It is to be understood that the following disclosure provides for many different embodiments or examples of implementing different features of various embodiments. Specific examples of components and arrangements are described below for purposes of discussion. These are, of course, merely examples and are not intended to be limiting.

Spatial descriptions, including such terms as "above," "below," "up," "left," "right," "down," "top," "bottom," "vertical," "horizontal," "side," "higher," "lower," "upper," "over," "under," and so forth, are used herein with respect to an orientation shown in corresponding figures unless otherwise specified. It should be understood that the spatial descriptions used herein are for purposes of illustration, and that practical implementations of the structures described herein can be spatially arranged in any orientation or manner, provided that the merits of embodiments of this disclosure are not deviated from by such arrangement.

Embodiments, or examples, illustrated in the figures are disclosed below using specific language. It will nevertheless be understood that the embodiments and examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed herein.

Arranging several storage units into an array to provide greater storage space and/or higher performance is a technology that has been widely used in industry. For example, RAID (Redundant Array of Independent Disks) was developed in the 1980s. The initial objective of RAID technology was to provide larger storage space and high performance by combining several inexpensive and low performance storage units (for example, hard drives) into an array. Since such an array may include a large number of storage units, data protection and data integrity become an important consideration for the array. Various solutions have been developed to provide safe data storage.

A common method for providing data protection to an array of storage units is to include redundant data patterns (for example, error correction data patterns, parity checking data patterns) within the array. Different technologies (for example, RAID level 5 and RAID level 6) have been developed to provide data integrity within the array of storage units. Once any one of the storage units within the array fails, or the data stored in any one of the storage units is lost, the lost data can be reconstructed or rebuilt based on the redundant data.

When one storage unit of the array is rebuilding, the input/output terminals (I/Os) of the array will be heavily occupied and the overall operations of the array get slower. In addition, the array is in a critical status in the duration when one storage unit of the array of storage units is rebuilding, because the array may not tolerate more storage units failure during this duration. As technology progresses, the speed for data recovery has become an important consideration because as the capacity of storage units increases, the time needed to reconstruct all the data stored in a failed storage unit increases as well. There is a need to develop a new mechanism to increase the speed for rebuilding an array of storage units.

FIG. 1 is a schematic diagram illustrating an apparatus according to some embodiments of the subject application.

Referring to FIG. 1, an apparatus 1 includes a control unit 2, an acceleration unit 4, a memory unit 10, a transceiving unit 12 and a storage system 16. The apparatus 1 may include a server, a data center, a data storage apparatus or the like.

A number of external devices or client hosts 14 are electrically connected to the apparatus 1 through either a wired or wireless communication interface (not illustrated in FIG. 1). A storage system 17, which includes multiple storage units, are electrically connected to the apparatus 1 through either a wired or wireless communication interface.

The memory unit 10 includes a cache 6. The memory unit 10 includes a set of lookup tables 8. The memory 10 may include computer program code stored therein (not illustrated in FIG. 1). The memory unit 10 and the computer program code are configured to, with the control unit 12, cause the apparatus 1 to perform several operations that will be described in the paragraphs below.

The control unit 2 may include but is not limited to, for example, a central processing unit (CPU), a microprocessor, an application-specific instruction set processor (A SIP), a machine control unit (MCU), a graphics processing unit (GPU), a physics processing unit (PPU), a digital signal processor (DSP), an image processor, a coprocessor, a storage controller, a floating-point unit, a network processor, a multi-core processor, a front-end processor or the like. The control unit 2 is electrically connected to the memory unit 10. The control unit 2 is electrically connected to the acceleration unit 4. The control unit 2 is electrically connected to the transceiving unit 12. The control unit 2 is electrically connected to the storage system 16.

The acceleration unit 4 may include but is not limited to, fir example, a microprocessor, a coprocessor, an application-specific instruction set processor (ASID), a physics processing unit (PPU), a digital signal processor (DSP), a synergistic processing elementor the like. The acceleration unit 4 is able to supplement the functions of the control unit 2. Operation performed by the acceleration unit 4 may include but is not limited to, for example, floating point arithmetic, graphics, signal processing, string processing, cryptography or I/O interfacing with peripheral devices. Performance of apparatus 1 may be accelerated with the help of the acceleration unit 4, which shares some tasks with the control unit 2.

The memory unit 10 may include but is not limited to a random-access memory (RAM) such as a static RAM (SRAM) or a dynamic RAM (DRAM). In some embodiments, the memory unit 10 may include a read-only memory (ROM). The memory unit 10 includes a cache 6 for storing data that have recently been accessed, so that future requests for that data can be served faster. The data stored in the cache 6 may include the result of an earlier computation of the control unit 2 or the acceleration unit 4. The data stored in the cache 6 may include a copy of data stored in one of the storage units 16.

The memory unit 10 includes a set of lookup tables 8. A lookup table 8 may include addresses of storage unit in the storage system 16 to be assigned to data. A lookup table 8 may include data attributes. A lookup table 8 may include categorization associated with data attributes. A lookup table 8 may include addresses of storage unit in the storage system 16 to be assigned to error correction data. A lookup table 8 may include addresses of storage unit in the storage system 16 to be assigned to reconstruction data. It is contemplated that the lookup tables 8 may be integrated into one single lookup table.

The apparatus 1 can access the storage system 16 based on the lookup table(s) 8. Based on the lookup table(s) 8, the apparatus 1 may reconstruct or rebuild data in the storage system 16. Based on the lookup table(s) 8, the apparatus 1 may store the reconstructed or rebuilt data in a spare region or space in the storage system 16.

The control unit 2 may be configured to create or generate lookup table(s) 8 and store them in the memory unit 10. The control unit 2 is configured to update the lookup table(s) 8 for a new or different data arrangement, deployment or allocation scheme in the storage system 16. The control unit 2 is configured to create or generate the lookup table(s) 8 and store them in the storage system 16. The control unit 2 is configured to read the lookup table(s) 8 from the storage system 16 and write them in the memory unit 10.

The transceiving unit 12 involves communications between the apparatus 1 and the external devices 14. The transceiving unit 12 involves communications between the apparatus 1 and the storage system 17. The transceiving unit 12 may include hardware component(s), software implementation compatible with an interface or communication protocol including but not limited to, for example, Ethernet, fibre channel over Ethernet (FCoE), peripheral component interconnect express (PCIe), advanced host controller interface (AHCI), Bluetooth, WiFi and cellular data service such as GSM, CDMA, CPRS, WCDMA, EDGE, CDMA2000 or LTE, or a combination of the above. An electrical connection exists between the control unit 2 and the transceiving unit 12. The electrical connection between the control unit 2 and the transceiving unit 12 may include but is not limited to a high speed I/O connection.

The storage system 16 includes multiple storage units. The storage unit of the storage system 16 may include but is not limited to, for example, a hard disk drive (HDD), a solid-state drive (SSD), an embedded multimedia card (eMMC), a secure digital (SD) memory card, or other type of storage device. The storage units of the storage system 16 may be arranged in an array and electrically connected to the control unit 2. In some embodiment, the lookup tables 8 may be stored in one of the storage units 16 and the control unit 2 can determine when to read them and put them into the memory unit 10.

The storage system 17 is similar to the storage system 16. The storage system 17 may function as a local data backup for the storage system 16. The storage system 17 may function as a cloud backup or online backup for the storage system 16.

The client hosts 14 may include an electronic device, for example but is not limited to, personal computer, laptop, server, mobile phone, tablet, internet of things (IoT) device, or the like.

Figure 2:
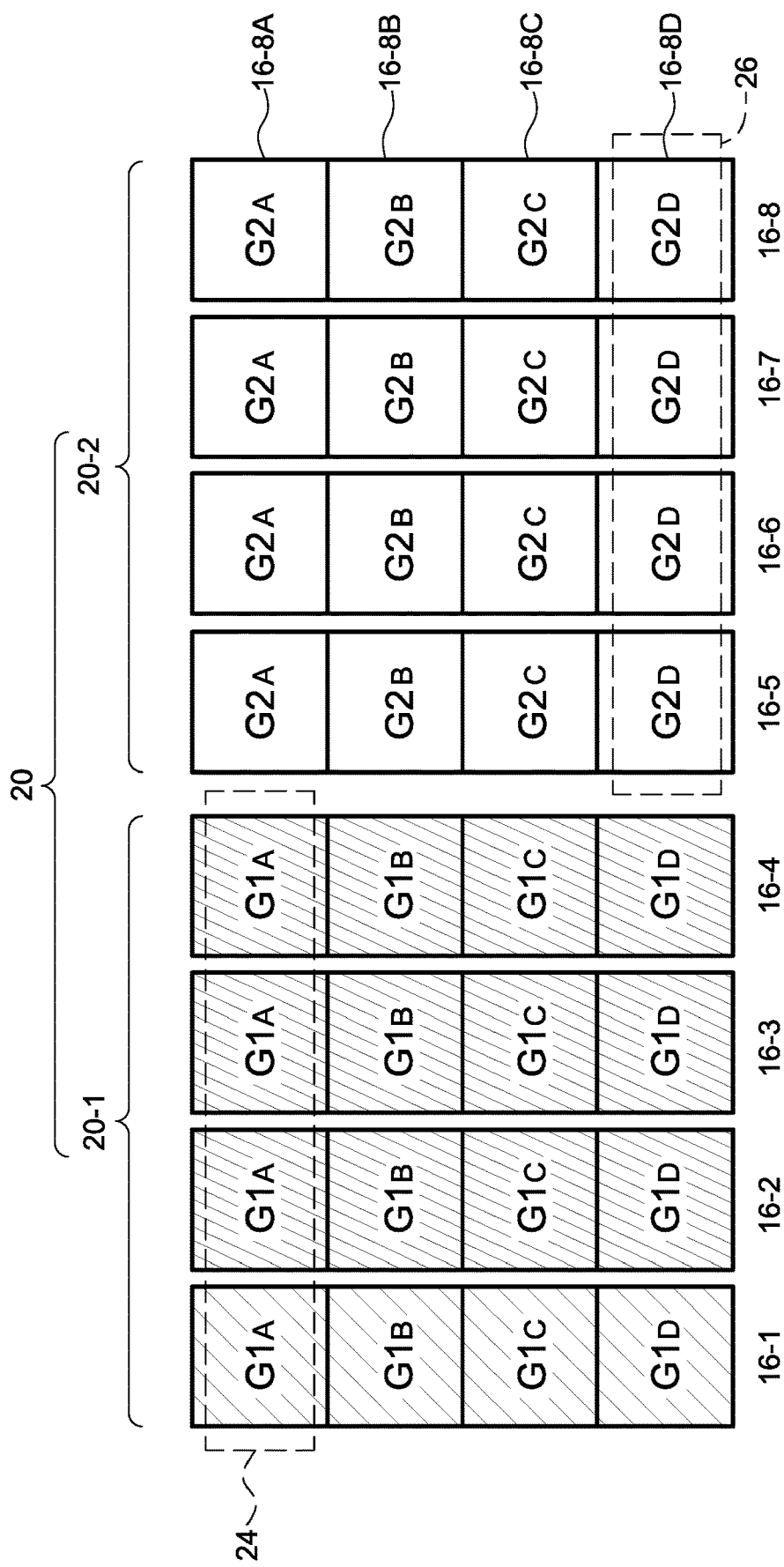
FIG. 2 is a schematic diagram illustrating a storage space configuration according to some comparative embodiments of the subject application.

FIG. 2 is a schematic diagram illustrating a storage space configuration according to some comparative embodiments of the subject application.

For simplicity, only the storage units 16-1, 16-2, 16-3, 16-4, 16-5, 16-6, 16-7 and 16-8 in the storage system 16 of the apparatus 1 are illustrated.

Referring to FIG. 2, the storage units 16-1 to 16-8 are categorized as an array 20. The storage units 16-1, 16-2, 16-3 and 16-4 are further grouped into subarrays 20-1. The storage units 16-5, 16-6, 16-7 and 16-8 are further grouped into subarrays 20-2.

Each of the storage units 16-1 to 16-8 includes a plurality of storage regions. In the embodiment shown in FIG. 2, each of the storage units 16-1 to 16-8 includes four consecutive storage regions (e.g., 16-8A, 16-8B, 16-8C and 16-8D). In some embodiments, the consecutive storage regions (e.g., 16-8A, 16-8B, 16-8C and 16-8D) are classified as distinct partitions for storing data.

Although not labeled in FIG. 2, the storage unit 16-1 includes consecutive storage regions 16-1A, 16-1B, 16-1C and 16-1D. The storage unit 16-2 includes consecutive storage regions 16-2A, 16-2B, 16-2C and 16-2D. The storage unit 16-3 includes consecutive storage regions 16-3A, 16-3B, 16-3C and 16-3D. The storage unit 16-4 includes consecutive storage regions 16-4A, 16-4B, 16-4C and 16-4D. The storage unit 16-5 includes consecutive storage regions 16-5A, 16-5B, 16-5C and 16-5D. The storage unit 16-6 includes consecutive storage regions 16-6A, 16-6B, 16-6C and 16-6D. The storage unit 16-7 includes consecutive storage regions 16-7A, 16-7B, 16-7C and 16-7D. The storage unit 16-8 includes consecutive storage regions 16-8A, 16-8B, 16-8C and 16-8D. In can be contemplated that more or less storage regions can be allocated in each of the storage units.

The data to be stored in the consecutive storage regions of the storage units may be referred to as data segments in the subsequent paragraphs. The data to be stored in the consecutive storage regions of the storage units may be referred to as data patterns the subsequent paragraphs.

In some embodiments, the consecutive storage region 16-8A may include a series of physically or logically consecutive addresses. The consecutive storage region 16-8B may include a series of physically or logically consecutive addresses. The consecutive storage region 16-8C may include a series of physically or logically consecutive addresses. The consecutive storage region 16-8D may include a series of physically or logically consecutive addresses.

For example, the consecutive storage region 16-8A may include a series of logically consecutive addresses [WW0001], [WW0002], [WW0003], [WW0004], [WW0005] in the storage unit 16-8. The consecutive storage region 16-89 may include a series of logically consecutive addresses [XX0001], [XX0002], [XX0003], [XX0004], [XX0005] in the storage unit 16-8. The consecutive storage region 16-8C may include a series of logically consecutive addresses [YY0001], [YY0002], [YY0003], [YY0004], [YY0005] in the storage unit 16-8. The consecutive storage region 16-8D may include a series of logically consecutive addresses [ZZ0001], [ZZ0002], [ZZ0003], [ZZ0004], [ZZ0005] in the storage unit 16-8.

In some embodiments, the consecutive storage region 16-8B is next to the consecutive storage region 16-8A. The consecutive storage region 16-8C is next to the consecutive storage region 16-8B. The consecutive storage region 16-8D is next to the consecutive storage region 16-8C. In some embodiments, the consecutive storage regions 16-8A, 16-8B, 16-8C and 16-8D may be adjacent to each other. In some embodiments, the consecutive storage regions 16-8A, 16-8B, 16-8C and 16-8D are not adjacent area to each other.

In some embodiments, the consecutive storage region 16-8A may include a series of physically consecutive sectors 1, 2, 3, 4, 5 on a track 1 in the storage unit 16-8. The consecutive storage region 16-8B may include a series of physically consecutive sectors 6, 7, 8, 9, 10 on the track 1 in the storage unit 16-8. The consecutive storage region 16-1C may include physically consecutive sectors 11, 12, 13, 14, 15 on the track 1 in the storage unit 16-8. The consecutive storage region 16-1D may include physically consecutive sectors 16, 17, 18, 19, 20 on the track 1 in the storage unit 16-8.

In some embodiments, the consecutive storage regions 16-8A and 16-8B are configured to have an end-to-end arrangement. The consecutive storage regions 16-8B and 16-8C are configured to have an end-to-end arrangement.

The consecutive storage regions 16-8C and 16-8D are configured to have an end-to-end arrangement. It is contemplated that any two of the consecutive storage regions 16-8A, 16-8B, 16-8C and 16-8D may be swapped.

Each of the storage units 16-1 to 16-7 may have a storage configuration same or similar to the storage unit 16-8. It is contemplated that each of the storage units 16-1 to 16-8 may be configured to have more or less consecutive storage regions.

The control unit 2 may store the data into the storage units 16-1 to 16-8 in accordance with the lookup table(s) 8 as shown in FIG. 1. The data to be stored into the storage units 16-1 to 16-8 are categorized before they are stored into the storage units 16-1 to 16-8. The data to be stored into the storage units 16-1 to 16-8 are divided into segments before they are stored into the storage units 16-1 to 16-8.

In the embodiment shown in FIG. 2, individual data integrity protections are applied to the subarrays 20-1 and 20-2. Referring to FIG. 2, the data to be stored in the storage units 16-1, 16-2, 16-3 and 16-4 are categorized as a data protection group G1 (which includes subgroups $G1_A$, $G1_B$, $G1_C$ and $G1_D$) and the data to be stored in the storage units 16-5, 16-6, 16-7 and 16-8 are categorized as a data protection group G2 (which includes subgroups $G2_A$, $G2_B$, $G2_C$ and $G2_D$).

The data integrity protection in the subarrays 20-1 and 20-2 are implemented by groups. The data protection is provided across the data categorized as the same group. For example, if the storage unit 16-1 fails or is damaged, the data stored therein can be reconstructed or rebuilt according to the data stored in the storage units 16-2, 16-3 and 16-4. Similarly, if the storage unit 16-5 fails or is damaged, the data stored therein can be reconstructed or rebuilt according to the data stored in the storage units 16-6, 16-7 and 16-8.

The data integrity protection in the subarrays 20-1 and 20-2 are implemented by subgroups. The data protection is provided across the data categorized as the same subgroup. For example, data protection is provided across the data categorized as subgroups $G1_A$. Data protection is provided across the data categorized as subgroups $G1_B$. Data protection is provided across the data categorized as subgroups $G1_C$. Data protection is provided across the data categorized as subgroups $G1_D$.

Similarly, data protection is provided across the data categorized as subgroups $G2_A$. Data protection is provided across the data categorized as subgroups $G2_B$. Data protection is provided across the data categorized as subgroups $G2_C$. Data protection is provided across the data categorized as subgroups $G2_D$.

Take the subarray 20-1 as an example, the dashed-lined rectangle 24 indicates a set of data stored across storage units 16-1 to 16-4 and categorized as subgroup $G1_A$. Data protection is provided across the data within the subgroup $G1_A$. In some embodiments, one of the four data categorized as subgroup $G1_A$ includes error correction data associated with the subgroup $G1_A$.

In some embodiments, the error correction data may include even parity data associated with the data categorized as subgroup $G1_A$. In some embodiments, the error correction data may include odd parity data associated with the data categorized as subgroup $G1_A$. It can be contemplated that the subgroup $G1_A$ may include any other error correction data adopted by other erasure codes techniques.

Assuming that the data stored in the storage region 16-2A of the storage unit 16-2 includes error correction data associated with the data categorized as the subgroup $G1_A$. Once the data categorized within the subgroup $G1_A$ (e.g., the data stored in the storage region 16-1A of the storage unit 16-1) fails or is damaged, the data stored therein can be reconstructed or rebuilt according to error correction data and the remaining data (e.g., the data stored in the storage region 16-3A of the storage unit 16-3 and the data stored in the storage region 16-4A of the storage unit 16-4) of the subgroup $G1_A$.

Take the subarray 20-2 as an example, the dashed-lined rectangle 26 indicates a set of data stored across storage units 16-5 to 16-8 and categorized as subgroup $G2_D$. Data protection is provided across the data within the subgroup $G2_D$. In some embodiments, one of the four data categorized as subgroup $G2_D$ includes error data associated with the subgroup $G2_D$.

In some embodiments, the error correction data may include even parity data associated with the data categorized as subgroup $G2_D$. In some embodiments, the error correction data may include odd parity data associated with the data categorized as subgroup $G2_D$. It can be contemplated that the subgroup $G2_D$ may include any other error correction data adopted by other erasure codes techniques.

Assuming that the data stored in the storage region 16-6D of the storage unit 16-6 includes error correction data associated with the data categorized as the subgroup $G2_D$. Once the data categorized within the subgroup $G2_D$ (e.g., the data stored in the storage region 16-5D of the storage unit 16-5) fails or is damaged, the data stored therein can be reconstructed or rebuilt according to error correction data and the remaining data (e.g., the data stored in the storage region 16-7A of the storage unit 16-7 and the data stored in the storage region 16-8A of the storage unit 16-8) of the subgroup $G2_D$.

In some embodiments, a file received from an external device (for example, one of the client hosts 14 shown in FIG. 1) is divided in segments before it is stored in the subarray 20-1. In some embodiments, the data stored in the storage units of the subarray 20-2 is a duplicated version of the data stored in the storage units of the subarray 20-1.

In some embodiments, a file received from an external device (for example, one of the client hosts 14 shown in FIG. 1) is divided in segments before it is stored in the subarrays 20-1 and 20-2.

The data allocation mechanism shown in FIG. 2 has its limitations, though. The process of recovering data from storage unit failures in an array of storage units is called data reconstruction. The data reconstruction process, in general, includes a step of reading all the data from the surviving storage units, a step of rebuilding or reconstructing the data in the failed storage unit based on the data stored in the surviving storage units, and a step of writing the rebuilt data back to the failed storage unit or to another spare storage unit.

Using the data allocation mechanism shown in FIG. 2, if one storage unit of the subarray 20-1 fails, all the other surviving storage units within the subarray 20-1 will be occupied by excessive read/write operations during the reconstruction process of the failed storage unit, while all the storage units within the subarray 20-2 idle. For example, if the storage unit 16-1 of the subarray 20-1 fails, all data stored in the surviving storage units 16-2, 16-3 and 16-4 need to be readout during the reconstruction process. Heavy work loading for each of the storage units 16-2, 16-3 and 16-4 adversely affects the performance of the array 20, while all the storage units 16-5 to 16-8 of the subarray 20-2 idle in the reconstruction process.

Figure 3:
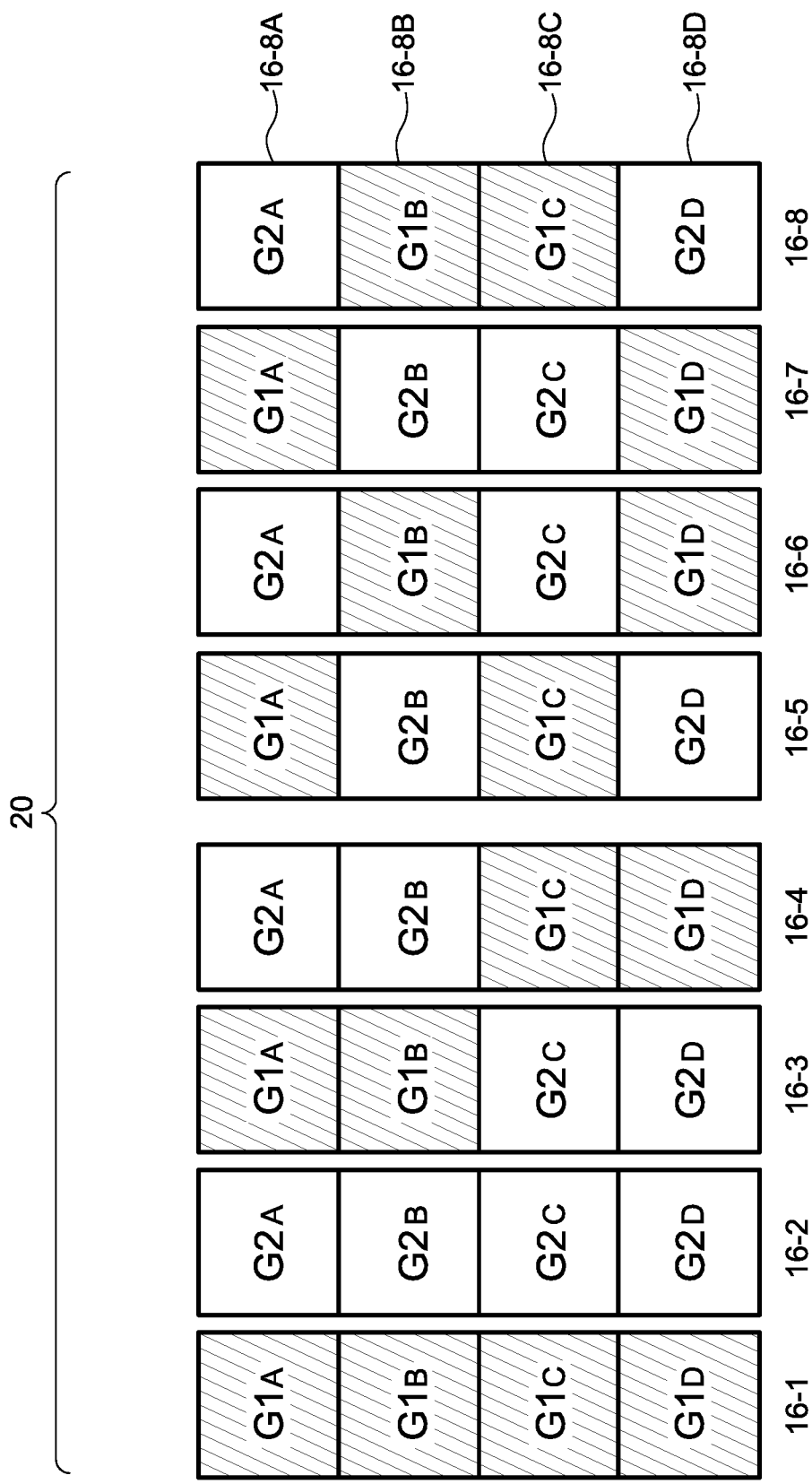
FIG. 3 is a schematic diagram illustrating a storage space configuration according to some embodiments of the subject application.

FIG. 3 is a schematic diagram illustrating a storage space configuration according to some embodiments of the subject application.

For simplicity, only the storage units 16-1, 16-2, 16-3, 16-4, 16-5, 16-6, 16-7 and 16-8 in the storage system 16 of the apparatus 1 are illustrated.

The control unit 2 may store the data into the storage units 16-1 to 16-8 in accordance with the lookup tables) 8 as shown in FIG. 1. The data to be stored into the storage units 16-1 to 16-8 are categorized before they are stored into the storage units 16-1 to 16-8.

The data integrity protection in the array 20 of FIG. 3 is implemented in a different manner than that of FIG. 2. Referring to FIG. 3, data to be stored in the storage units 16-1 to 16-8 are categorized as two data protection groups G1 and G2. The group data protection group G1 are further categorized as subgroups $G1_A$, $G1_B$, $G1_C$ and $G1_D$. The group data protection group G2 are further categorized as subgroups $G2_A$, $G2_B$, $G2_C$ and $G2_D$.

The data integrity protection in the array 20 is implemented by groups. The data protection is provided across the data categorized as the same group. For example, data protection is provided across the data categorized as group G1. Data protection is provided across the data categorized as group G2.

The data integrity protection in the array 20 is implemented by subgroups. The data protection is provided across the data categorized as the same subgroup. For example, data protection is provided across the data categorized as subgroups $G1_A$. Data protection is provided across the data categorized as subgroups $G1_B$. Data protection is provided across the data categorized as subgroups $G1_C$. Data protection is provided across the data categorized as subgroups $G1_D$.

Similarly, data protection is provided across the data categorized as subgroups $G2_A$. Data protection is provided across the data categorized as subgroups $G2_B$. Data protection is provided across the data categorized as subgroups $G2_C$. Data protection is provided across the data categorized as subgroups $G2_D$.

In some embodiments, one of the four data categorized as subgroup $G1_A$ includes error correction data associated with the subgroup $G1_A$. In some embodiments, one of the four data categorized as subgroup $G1_B$ includes error correction data associated with the subgroup $G1_B$. In some embodiments, one of the four data categorized as subgroup $G1_C$ includes error correction data associated with the subgroup $G1_C$. In some embodiments, one of the four data categorized as subgroup $G1_D$ includes error correction data associated with the subgroup $G1_D$.

In some embodiments, one of the four data categorized as subgroup $G2_A$ includes error correction data associated with the subgroup $G2_A$. In some embodiments, one of the four data categorized as subgroup $G2_B$ includes error correction data associated with the subgroup $G2_B$. In some embodiments, one of the four data categorized as subgroup $G2_C$ includes error correction data associated with the subgroup $G2_C$. In some embodiments, one of the four data categorized as subgroup $G2_D$ includes error correction data associated with the subgroup $G2_D$.

Data categorized as different subgroups are not associated with each other. Data categorized as different subgroups are independent of each other.

If one of the data in a subgroup (e.g., subgroup $G1_A$) is damaged or fail, the damaged data can be rebuilt or reconstructed according to the other data in the same subgroup. For example, if the storage unit 16-1 fails or is damaged, the data stored in the consecutive storage region 16-1A of the storage unit 16-1 can be rebuilt or reconstructed according to the other data in the subgroup $G1_A$ (e.g., the data stored in the consecutive storage regions 16-3A, 16-5A and 16-7A). The data stored in the consecutive storage region 16-1B of the storage unit 16-1 can be rebuilt or reconstructed according to the other data in the subgroup $G1_B$ (e.g., the data stored in the consecutive storage regions 16-3B, 16-6B and 16-8B). The data stored in the consecutive storage region 16-1C of the storage unit 16-1 can be rebuilt or reconstructed according to the other data in the subgroup $G1_C$ (e.g., the data stored in the consecutive storage regions 16-4C, 16-5C and 16-8C). The data stored in the consecutive storage region 16-1D of the storage unit 16-1 can be rebuilt or reconstructed according to the other data in the subgroup $G1_D$ (e.g., the data stored in the consecutive storage regions 16-4D, 16-6D and 16-7D).

Referring to FIG. 3, if the storage unit 16-1 fails or is damaged, the work loading of the data reconstruction process is shared by six storage units (that is, storage units 16-3 to 16-8). For each storage unit involved in the data reconstruction process, only half of the storage regions need to be accessed. Take the storage unit 16-3 as an example, only the storage regions 16-3A and 16-3B need to be accessed during the data reconstruction process of the storage unit 16-1. Similarly, if we look into the storage unit 16-4, only the storage regions 16-4C and 16-4D of the storage unit 16-4 need to be accessed during the data reconstruction process of the storage unit 16-1.

In the storage space configuration shown in FIG. 3, the work loading for rebuilding a failed storage unit is shared by a plurality of storage units in the array. Sharing work loading of the data reconstruction process by a plurality of storage units increases the lifetime of each of the storage units within the array 20. In addition, following the storage space configuration as shown in FIG. 3, the speed of the data reconstruction process can be increased by multiple times compared to that of FIG. 2 because more storage units participate in the data reconstruction process. Specifically, each of the storage units 16-3 to 16-8 only needs to offer 50% of its data in the data reconstruction process, it can be expected that the time spent on reading data from the storage units 16-3 to 16-8 is reduced 50%. The speed of data reconstruction process is then doubled.

Figure 4:
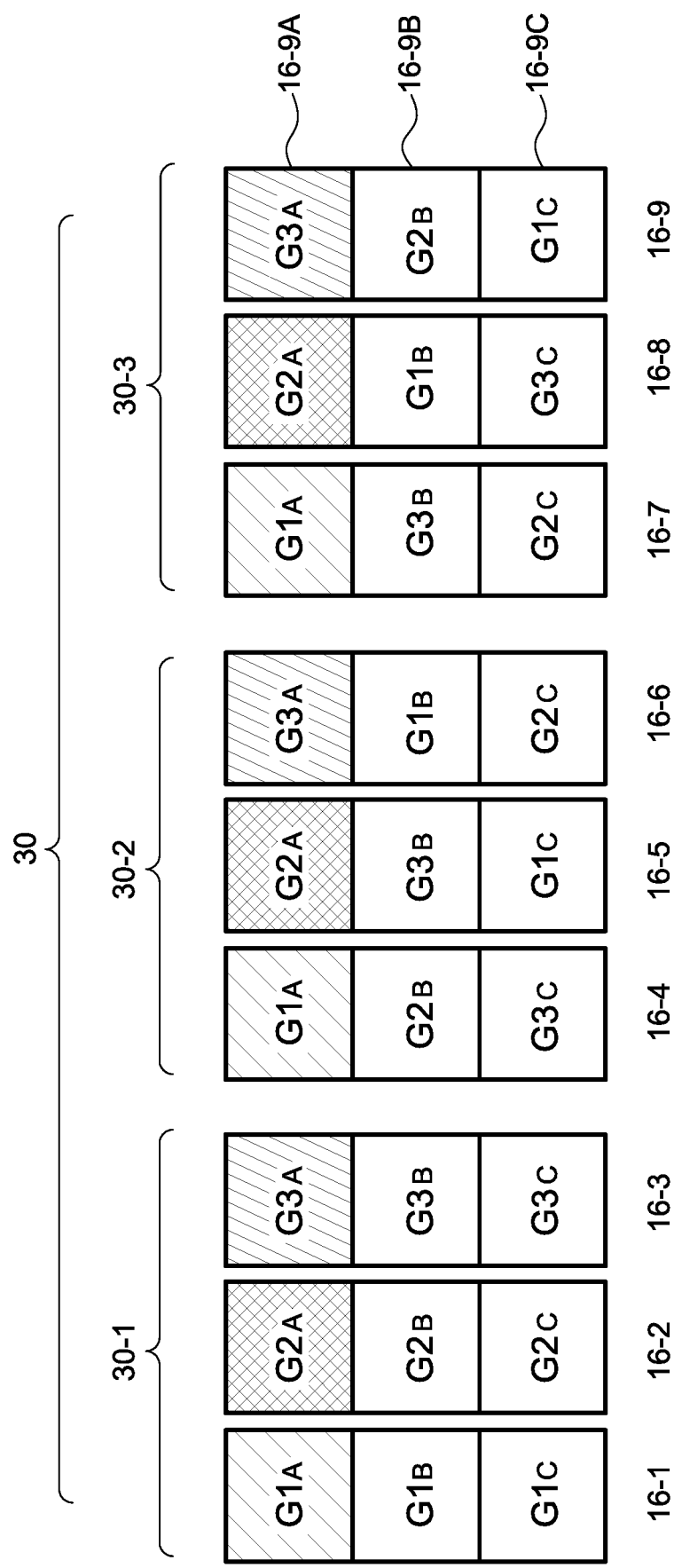
FIG. 4 is a schematic diagram illustrating a storage space configuration according to some embodiments of the subject application.

FIG. 4 is a schematic diagram illustrating a storage space configuration according to some embodiments of the subject application. For simplicity, only the storage units 16-1, 16-2, 16-3, 16-4, 16-5, 16-6, 16-7, 16-8 and 16-9 in the storage system 16 of the apparatus 1 are illustrated.

Referring to FIG. 4, the storage units 16-1, 16-2, 16-3, 16-4, 16-5, 16-6, 16-7, 16-8 and 16-9 are categorized as an array 30. The storage units 16-1, 16-2 and 16-3 are further categorized as a subarray 30-1. The storage units 16-4, 16-5 and 16-6 are further categorized as a subarray 30-2. The storage units 16-7, 16-8 and 16-9 are further categorized as a subarray 30-3.

Although not labeled in FIG. 4, the storage unit 16-1 includes consecutive storage regions 16-1A, 16-1B and 16-1C. The storage unit 16-2 includes consecutive storage regions 16-2A, 16-2B and 16-2C. The storage unit 16-3 includes consecutive storage regions 16-3A, 16-3B and 16-3C. The storage unit 16-4 includes consecutive storage regions 16-4A, 16-4B and 16-4C. The storage unit 16-5 includes consecutive storage regions 16-5A, 16-5B and 16-5C. The storage unit 16-6 includes consecutive storage regions 16-6A, 16-6B and 16-6C. The storage unit 16-7 includes consecutive storage regions 16-7A, 16-73 and 16-7C. The storage unit 16-8 includes consecutive storage regions 16-8A, 16-8B and 16-8C. The storage unit 16-9 includes consecutive storage regions 16-9A, 16-93 and 16-9C. In can be contemplated that more or less storage regions can be allocated in each of the storage units.

The control unit 2 may store the data into the storage units 16-1 to 16-9 in accordance with the lookup table(s) 8 as shown in FIG. 1. The data to be stored into the storage units 16-1 to 16-9 are categorized before they are stored into the storage units 16-1 to 16-9.

The data integrity protection in the array 30 is implemented by groups. The data protection is provided across the data categorized as the same group. For example, data protection is provided across the data categorized as group G1. Data protection is provided across the data categorized as group G2. Data protection is provided across the data categorized as group G3.

The data integrity protection in the array 30 is implemented by subgroups. The data protection is provided across the data categorized as the same subgroup. For example, data protection is provided across the data categorized as subgroups $G1_A$. Data protection is provided across the data categorized as subgroups $G1_B$. Data protection is provided across the data categorized as subgroups $G1_C$.

Data protection is provided across the data categorized as subgroups $G2_A$. Data protection is provided across the data categorized as subgroups $G2_B$. Data protection is provided across the data categorized as subgroups $G2_C$.

Similarly, data protection is provided across the data categorized as subgroups $G3_A$. Data protection is provided across the data categorized as subgroups $G3_B$. Data protection is provided across the data categorized as subgroups $G3_C$.

In some embodiments, one of the three data categorized as subgroup $G1_A$ includes error correction data associated with the subgroup $G1_A$. In some embodiments, one of the three data categorized as subgroup $G1_B$ includes error correction data associated with the subgroup $G1_B$. In some embodiments, one of the three data categorized as subgroup $G1_C$ includes error correction data associated with the subgroup $G1_C$.

In some embodiments, one of the three data categorized as subgroup $G2_A$ includes error correction data associated with the subgroup $G2_A$. In some embodiments, one of the three data categorized as subgroup $G2_B$ includes error correction data associated with the subgroup $G2_B$. In some embodiments, one of the three data categorized as subgroup $G2_C$ includes error correction data associated with the subgroup $G2_C$.

In some embodiments, one of the three data categorized as subgroup $G3_A$ includes error correction data associated with the subgroup $G3_A$. In some embodiments, one of the three data categorized as subgroup $G3_B$ includes error correction data associated with the subgroup $G3_B$. In some embodiments, one of the three data categorized as subgroup $G3_C$ includes error correction data associated with the subgroup $G3_C$.

If one of the data in a subgroup (e.g., subgroup $G1_A$) is damaged or fail, the damaged data can be rebuilt or reconstructed according to the other data in the same subgroup. For example, if the storage unit 16-1 fails or is damaged, the data stored in the consecutive storage region 16-1A of the storage unit 16-1 can be rebuilt or reconstructed according to the other data in the subgroup $G1_A$ (e.g., the data stored in the consecutive storage regions 16-4A and 16-7A). The data stored in the consecutive storage region 16-1B of the storage unit 16-1 can be rebuilt or reconstructed according to the other data in the subgroup $G1_B$ (e.g., the data stored in the consecutive storage regions 16-6B and 16-8B). The data stored in the consecutive storage region 16-1C of the storage unit 16-1 can be rebuilt or reconstructed according to the other data in the subgroup $G1_C$ (e.g., the data stored in the consecutive storage regions 16-5C and 16-9C).

In the storage space configuration shown in FIG. 4, when one storage region of the storage unit within a subarray is rebuilding, only one storage unit from each of the other two subarrays need to be involved. For example, when rebuilding the data stored in the storage region 16-1A of the storage unit 16-1, the storage unit 16-4 from the subarray 30-2 and the storage unit 16-7 from the subarray 30-3 need to be accessed, while the remaining storage units of the subarrays 30-2 and 30-3 are not involved. Similarly, when rebuilding the data stored in the storage region 16-2A of the storage unit 16-2, the storage unit 16-5 from the subarray 30-2 and the storage unit 16-8 from the subarray 30-3 need to be accessed, while the remaining storage units of the subarrays 30-2 and 30-3 are not involved.

In the storage space configuration shown in FIG. 4, the work loading for rebuilding a failed storage unit within a subarray is shared by storage units belonging to other subarrays. Sharing work loading of the data reconstruction process by all the storage units increases the lifetime of each of the storage units within the array 30. In addition, following the data allocation mechanism as shown in FIG. 4, the speed of the data reconstruction process can be increased by multiple times compared to that of FIG. 2 because more storage units participate in parallel within the data reconstruction process.

Specifically, each of the storage units involved in the data reconstruction process only needs to offer 33% of its data, it can be expected that the time spent on reading data from the storage units involved is reduced 67%. The speed of data reconstruction process is then increased by triple times.

Figure 4A:
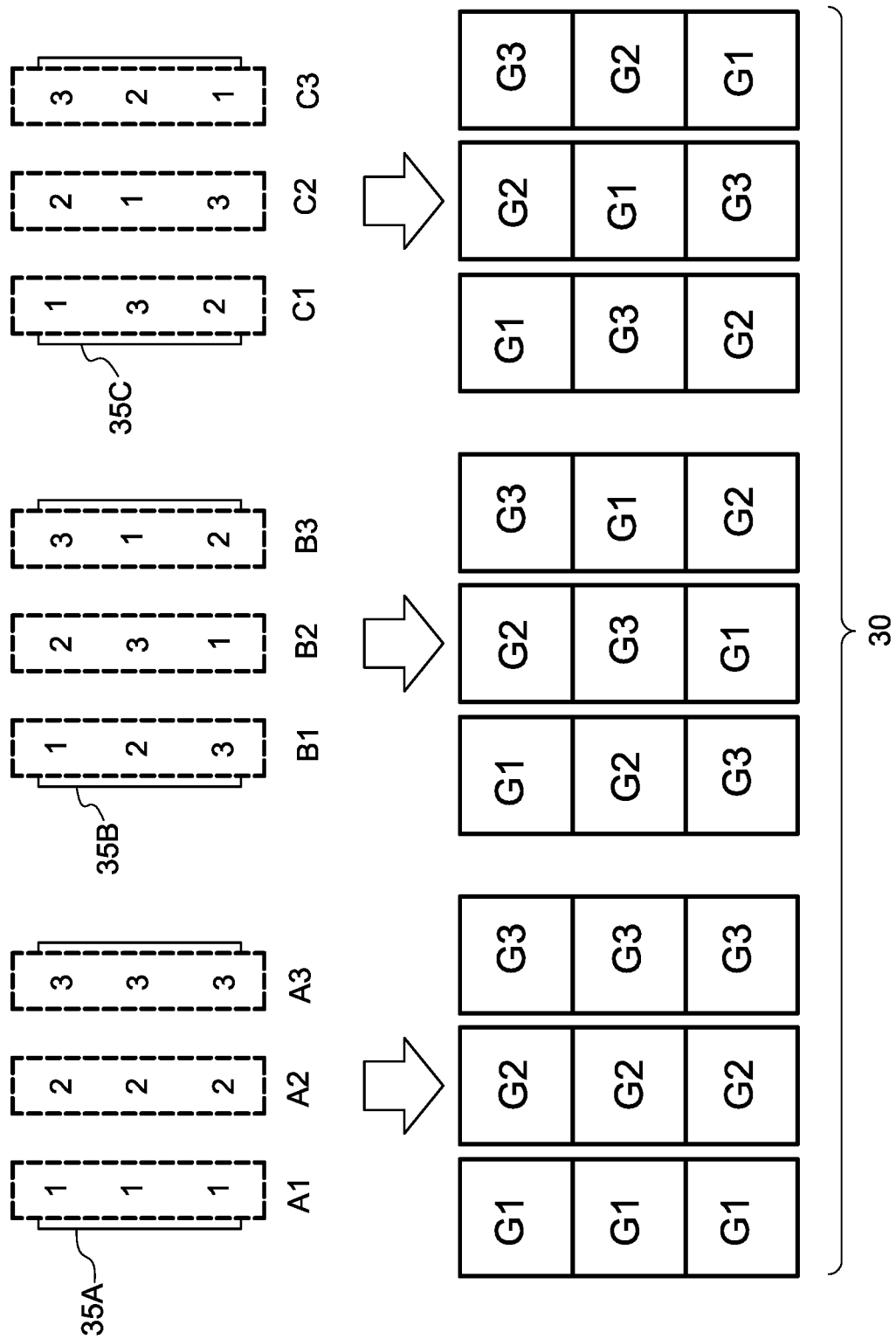
FIG. 4A is a schematic diagram illustrating the data allocation algorithm for an array of storage units according to some embodiments of the present disclosure.

FIG. 4A is a schematic diagram illustrating the data allocation algorithm for an array of storage units according to some embodiments of the present disclosure. In order to balance the work loading of the data reconstruction process within an array of storage units, the data to be stored in the array are arranged in a specific manner.

FIG. 4A shows three matrices 35A, 35B and 35C, each of the three matrices is an order 3 matrix (that is, the dimension of matrices 35A, 35B and 35C is 3×3). The matrix 35A is referred to as a basic matrix. The matrix 35B and 35C are 3×3 mutual orthogonal Latin square set. A Latin square of order n is an n×n matrix filled with n different items, each of the n different items occurring exactly once in each row and column of the matrix. The meanings of "orthogonal" and "orthogonal Latin square set" will be explained in the subsequent paragraph.

As shown in FIG. 4A, the matrix 35A includes three arrays: $A1=\{1, 1, 1\}^T$, $A2=\{2, 2, 2\}^T$, and $A3=\{3, 3, 3\}^T$. The matrix 35B includes three arrays: $B1=\{1, 2, 3\}^T$, $B2=\{2, 3, 1\}^T$, and $B3=\{3, 1, 2\}^T$. The matrix 35C includes three arrays: $C1=\{1, 3, 2\}^T$, $C2=\{2, 1, 3\}^T$, and $C3=\{3, 2, 1\}^T$.

The arrays A1, A2 and A3 of the matrix 35A are orthogonal to each other because the arrays A1, A2 and A3 comply with the following equation:

$$A_i \cap A_j = \emptyset \text{ if } i \neq j \quad (1)$$

That is, the intersection of any two of the arrays A1, A2 and A3 is an empty set. Similarly, the arrays B1, B2 and B3 of the matrix 35B are orthogonal to each other, and the arrays C1, C2 and C3 of the matrix 35C are orthogonal to each other. The arrays B1, B2, B3, C1, C2 and C3 comply with the following equations:

$$B_i \cap B_j = \emptyset \text{ if } i \neq j \quad (2)$$

$$C_i \cap C_j = \emptyset \text{ if } i \neq j \quad (3)$$

That is, the intersection of any two of the arrays B1, B2 and B3 is an empty set, and the intersection of any two of the arrays C1, C2 and C3 is an empty set.

The matrix 35B and 35C are mutual orthogonal Latin square set then the arrays B1, B2, B3, C1, C2 and C3 comply with the following equation:

$$B_i \cap C_j = \{\text{one element of } \{1,2,3\}\} \quad (4)$$

That is, the intersection of one array of the matrix 35B and one array of the matrix 35C is one element. For example, the intersection of the array B1 and the array C1 is "1," the intersection of the array B1 and the array C2 is "3," and the intersection of the array B1 and the array C3 is "2."

The matrices 35A, 35B and 35C also comply with the following equations:

$$A_i \cap B_j = \{\text{one element of } \{1,2,3\}\} \quad (5)$$

$$A_i \cap C_j = \{\text{one element of } \{1,2,3\}\} \quad (6)$$

That is, the intersection of one array of the matrix 35A and one array of the matrix 35B is one element, and the intersection of one array of the matrix 35A and one array of the matrix 35C is one element. For example, the intersection of the array A1 and the array B1 is "1," the intersection of the array A1 and the array B2 is "1," and the intersection of the array A1 and the array B3 is "1" Similarly, the intersection of the array A2 and the array C1 is "2," the intersection of the array A2 and the array C2 is "2," and the intersection of the array A2 and the array C3 is "2."

Following the rules illustrated above, any array within the matrix 35A intersects only one element of any array within the matrix 35B, and only one element of any array within the matrix 35C. One array within the matrix 35B intersects only one element of any array within the matrix 35A and only one element of any array within the matrix 35C. One array within the matrix 35C intersects only one element of any array within the matrix 35A and only one element of any array within the matrix 35B.

Referring to FIG. 4A, data protection groups G1, G2 and G3 of the array 30 of storage units are arranged based on the matrices 35A, 35B and 35C. Following the allocation mechanism using a basic 3×3 matrix and a mutual orthogonal Latin square set, the rebuilding speed of a failed storage unit within the array 30 can be increased by multiple times. In the case that an order 3 mutual orthogonal Latin square set is used, the rebuilding speed can be increased by 3 times.

It can be contemplated that a higher order mutual orthogonal Latin square set may be utilized. For example, if an order 4 mutual orthogonal Latin square set is used, the rebuilding speed can be increased by 4 times, and the rebuilding speed can be increased by 5 times if an order 5 mutual orthogonal Latin square set is used.

Figure 5A:
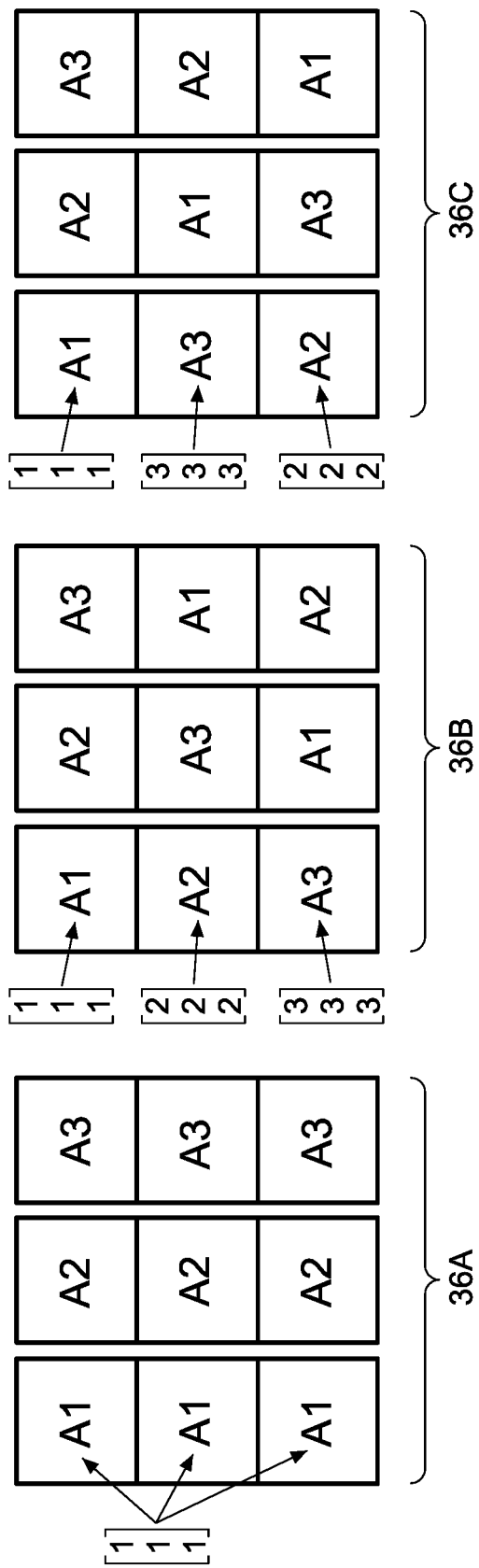
FIG. 5A is a schematic diagram illustrating a storage space configuration according to some embodiments of the subject application.

FIG. 5A is a schematic diagram illustrating a storage space configuration according to some embodiments of the subject application. A method of deploying the Latin square set into more storage units is discussed in accordance with FIGS. 5A-5J. FIG. 5A shows matrices 36A, 36B and 36C. The arrays A1, A2 and A3 discussed previously in accordance with FIG. 4A are utilized to expanding the number of storage units that could be used in accordance with the present disclosure.

Each of the matrices 36A, 36B and 36C includes several arrays A1, A2 and A3 arranged based on the mutual orthogonal Latin square set principle as illustrated in accordance with FIG. 4A. The items of the arrays A1, A2 and A3 are filled into the matrices 36A, 36B and 36C. That is, items $\{1, 1, 1\}^T$, $\{2, 2, 2\}^T$ and $\{3, 3, 3\}^T$ are filled into the matrices 36A, 36B and 36C.

Figure 5B:
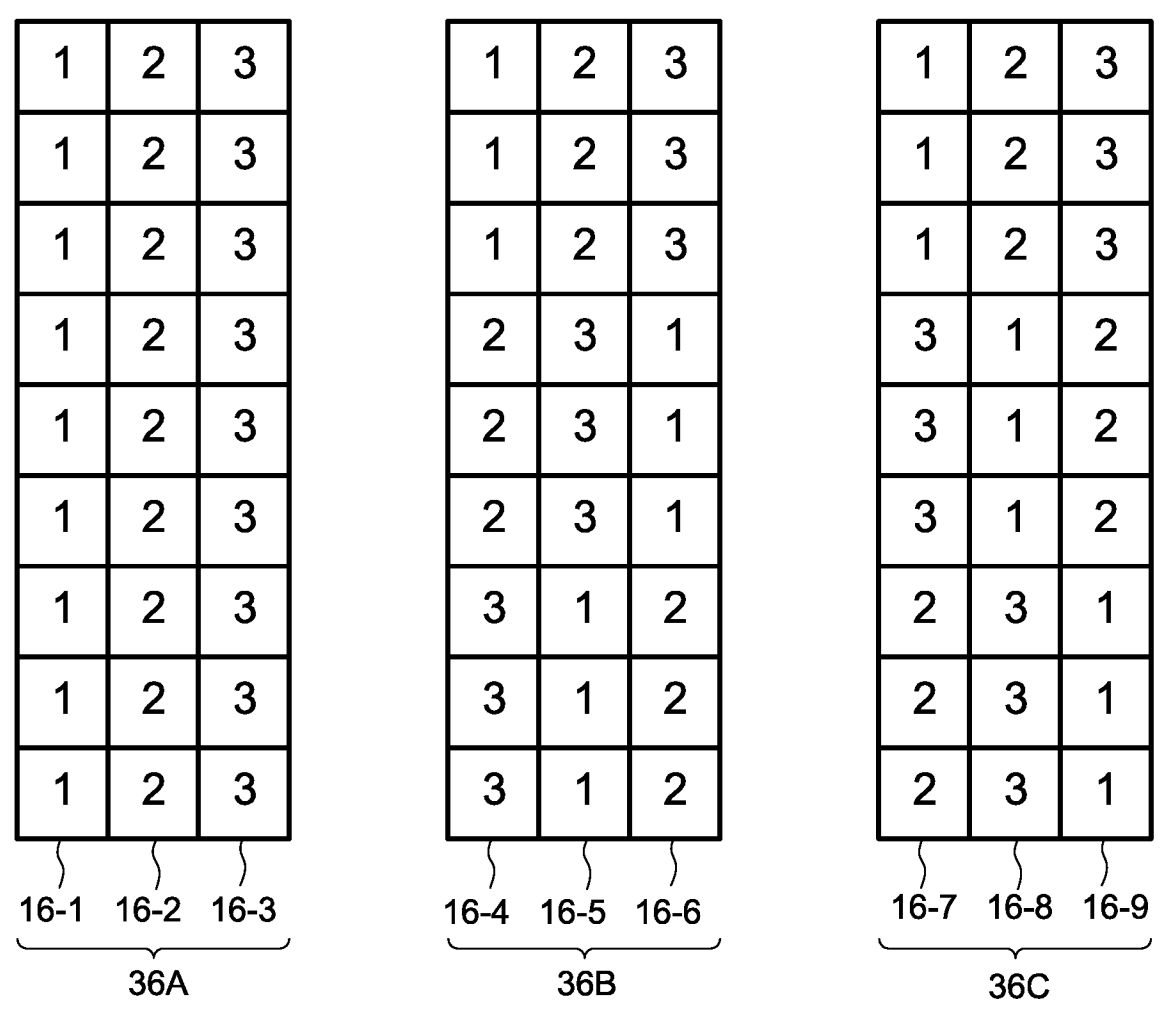

FIG. 5B is a schematic diagram illustrating a storage space configuration according to some embodiments of the subject application. After the items of the arrays A1, A2 and A3 are filled into the matrices 36A, 36B and 36C, a data allocation portfolio for nine storage units can be obtained. That is, data to be stored in the storage units 16-1 to 16-9 can follow the portfolio as shown in FIG. 5B. The matrices 36A, 36B and 36C may also be referred to as subarrays 36A, 36B and 36C.

Referring to FIG. 5B, the data to be stored in the storage units 16-1 to 16-9 are categorized as three data protection groups (labeled in FIG. 5B as numbers "1," "2" and "3"). The three data protection groups will be further categorized into subgroups, which will be described in the subsequent paragraphs.

Figure 5C:
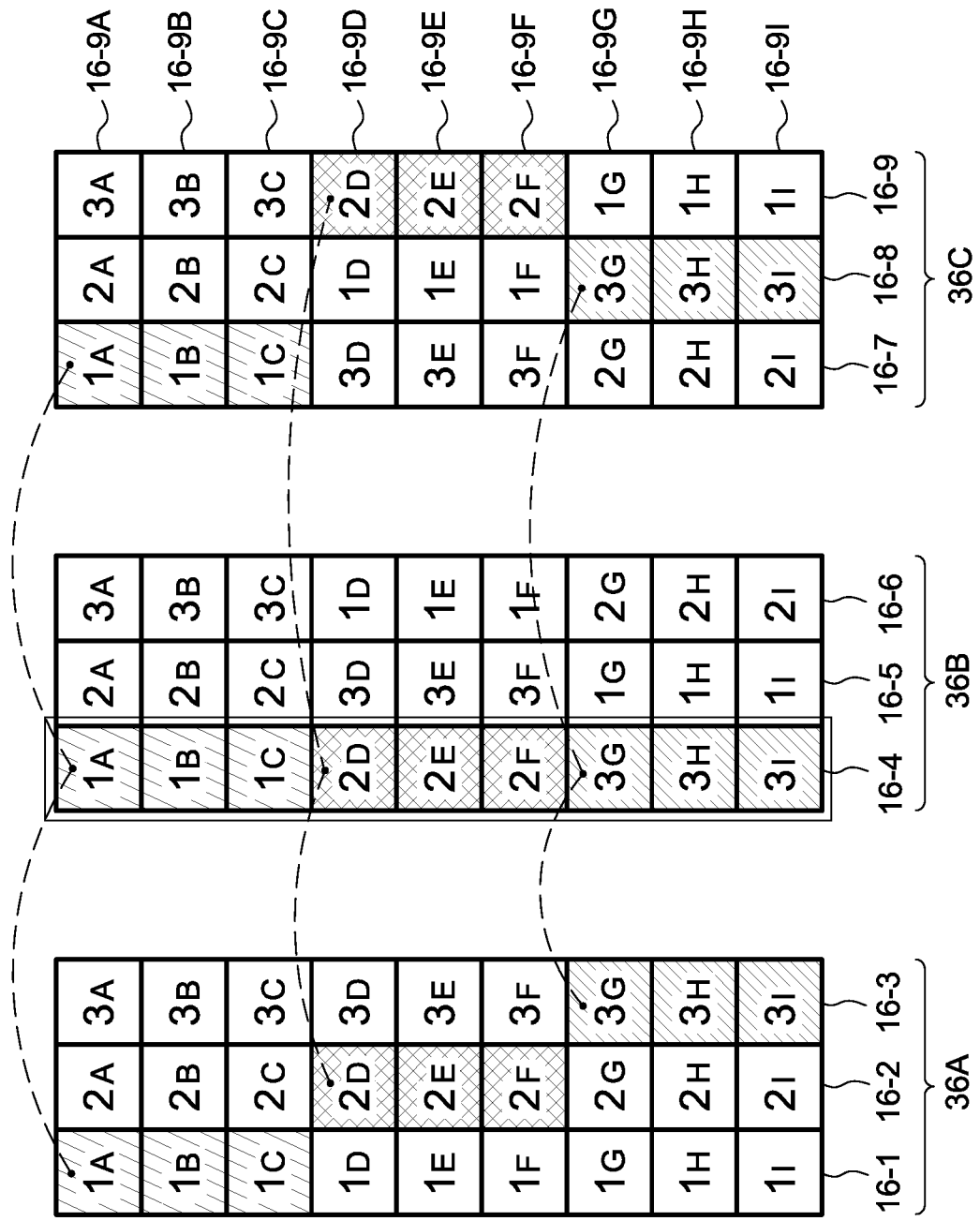
FIG. 5C is a schematic diagram illustrating a storage space configuration according to some embodiments of the subject application.

FIG. 5C is a schematic diagram illustrating a storage space configuration according to some embodiments of the subject application.

Although not labeled in FIG. 5C, the storage unit 16-1 includes consecutive storage regions 16-1A, 16-1B, 16-1C, 16-1D, 16-1E, 16-1F, 16-1G, 16-1H and 16-1I. The storage unit 16-2 includes consecutive storage regions 16-2A, 16-2B, 16-2C, 16-2D, 16-2E, 16-2F, 16-2G, 16-2H and 16-2I. The storage unit 16-3 includes consecutive storage regions 16-3A, 16-3B, 16-3C, 16-3D, 16-3E, 16-3F, 16-3G, 16-3H and 16-3I. The storage unit 16-4 includes consecutive storage regions 16-4A, 16-4B, 16-4C, 16-4D, 16-4E, 16-4F, 16-4G, 16-4H and 16-4I. The storage unit 16-5 includes consecutive storage regions 16-5A, 16-5B, 16-5C, 16-5D, 16-5E, 16-5F, 16-5G, 16-5H and 16-5I. The storage unit 16-6 includes consecutive storage regions 16-6A, 16-6B, 16-6C, 16-6D, 16-6E, 16-6F, 16-6G, 16-6H and 16-6I. The storage unit 16-7 includes consecutive storage regions 16-7A, 16-7B, 16-7C, 16-7D, 16-7E, 16-7F, 16-7G, 16-7H and 16-7I. The storage unit 16-8 includes consecutive storage regions 16-8A, 16-8B, 16-8C, 16-8D, 16-8E, 16-8F, 16-8G, 16-8H and 16-8I. The storage unit 16-9 includes consecutive storage regions 16-9A, 16-93, 16-9C, 16-9D, 16-9E, 16-9F, 16-9G, 16-9H and 16-9I.

Referring to FIG. 5C, the data protection group "1" is further categorized into subgroups $1_A$, $1_B$, $1_C$, $1_D$, $1_E$, $1_F$, $1_G$, $1_H$ and $1_I$. The data protection group "2" is further categorized into subgroups $2_A$, $2_B$, $2_C$, $2_D$, $2_E$, $2_F$, $2_G$, $2_H$ and $2_I$. The data protection group "3" is further categorized into subgroups $3_A$, $3_B$, $3_C$, $3_D$, $3_E$, $3_F$, $3_G$, $3_H$ and $3_I$.

The data integrity protection in the subarrays 36A, 36B and 36C is implemented by subgroups. The data protection is provided across the data categorized as the same subgroup. For example, data protection is provided across the data categorized as subgroups $1_A$. Data protection is provided across the data categorized as subgroups $1_B$. Data protection is provided across the data categorized as subgroups $1_C$. Data protection is provided across the data categorized as subgroups $1_D$. Data protection is provided across the data categorized as subgroups $1_E$. Data protection is provided across the data categorized as subgroups $1_F$. Data protection is provided across the data categorized as subgroups $1_G$. Data protection is provided across the data categorized as subgroups $1_H$. Data protection is provided across the data categorized as subgroups $1_I$.

Similarly, data protection is provided across the data categorized as subgroups $2_A$. Data protection is provided across the data categorized as subgroups $2_B$. Data protection is provided across the data categorized as subgroups $2_C$. Data protection is provided across the data categorized as subgroups $2_D$. Data protection is provided across the data categorized as subgroups $2_E$. Data protection is provided across the data categorized as subgroups $2_F$. Data protection is provided across the data categorized as subgroups $2_G$. Data protection is provided across the data categorized as subgroups $2_H$. Data protection is provided across the data categorized as subgroups $2_I$.

Additionally, data protection is provided across the data categorized as subgroups $3_A$. Data protection s provided across the data categorized as subgroups $3_B$. Data protection is provided across the data categorized as subgroups $3_C$. Data protection is provided across the data categorized as subgroups $3_D$. Data protection is provided across the data categorized as subgroups $3_E$. Data protection is provided across the data categorized as subgroups $3_F$. Data protection is provided across the data categorized as subgroups $3_G$. Data protection is provided across the data categorized as subgroups $3_H$. Data protection is provided across the data categorized as subgroups $3_I$.

In some embodiments, one of the three data categorized as subgroup $1_A$ includes error correction data associated with the subgroup $1_A$. In some embodiments, one of the three data categorized as subgroup $1_B$ includes error correction data associated with the subgroup $1_B$. In some embodiments, one of the three data categorized as subgroup $1_C$ includes error correction data associated with the subgroup $1_C$. In some embodiments, one of the three data categorized as subgroup $1_D$ includes error correction data associated with the subgroup $1_D$. In some embodiments, one of the three data categorized as subgroup $1_E$ includes error correction data associated with the subgroup $1_E$. In some embodiments, one of the three data categorized as subgroup $1_F$ includes error correction data associated with the subgroup $1_F$. In some embodiments, one of the three data categorized as subgroup $1_G$ includes error correction data associated with the subgroup $1_G$. In some embodiments, one of the three data categorized as subgroup $1_H$ includes error correction data associated with the subgroup $1_H$. In some embodiments, one of the three data categorized as subgroup $1_I$ includes error correction data associated with the subgroup $1_I$.

In some embodiments, one of the three data categorized as subgroup $2_A$ includes error correction data associated with the subgroup $2_A$. In some embodiments, one of the three data categorized as subgroup $2_B$ includes error correction data associated with the subgroup $2_B$. In some embodiments, one of the three data categorized as subgroup $2_C$ includes error correction data associated with the subgroup $2_C$. In some embodiments, one of the three data categorized as subgroup $2_D$ includes error correction data associated with the subgroup $2_D$. In some embodiments, one of the three data categorized as subgroup $2_E$ includes error correction data associated with the subgroup $2_E$. In some embodiments, one of the three data categorized as subgroup $2_F$ includes error correction data associated with the subgroup $2_F$. In some embodiments, one of the three data categorized as subgroup $2_G$ includes error correction data associated with the subgroup $2_G$. In some embodiments, one of the three data categorized as subgroup $2_H$ includes error correction data associated with the subgroup $2_H$. In some embodiments, one of the three data categorized as subgroup $2_I$ includes error correction data associated with the subgroup $2_I$.

In some embodiments, one of the three data categorized as subgroup $3_A$ includes error correction data associated with the subgroup $3_A$. In some embodiments, one of the three data categorized as subgroup $3_B$ includes error correction data associated with the subgroup $3_B$. In some embodiments, one of the three data categorized as subgroup $3_C$ includes error correction data associated with the subgroup $3_C$. In some embodiments, one of the three data categorized as subgroup $3_D$ includes error correction data associated with the subgroup $3_D$. In some embodiments, one of the three data categorized as subgroup $3_E$ includes error correction data associated with the subgroup $3_E$. In some embodiments, one of the three data categorized as subgroup $3_F$ includes error correction data associated with the subgroup $3_F$. In some embodiments, one of the three data categorized as subgroup $3_G$ includes error correction data associated with the subgroup $3_G$. In some embodiments, one of the three data categorized as subgroup $3_H$ includes error correction data associated with the subgroup $3_H$. In some embodiments, one of the three data categorized as subgroup $3_I$ includes error correction data associated with the subgroup $3_I$.

Data categorized as different subgroups are not associated with each other. Data categorized as different subgroups are independent of each other.

If one of the data in a subgroup (e.g., subgroup $1_A$) is damaged or fail, the damaged data can be rebuilt or reconstructed according to the other data in the same subgroup.

For example, if the storage unit 16-4 fails or is damaged, the data stored in the consecutive storage region 16-4A of the storage unit 16-4 can be rebuilt or reconstructed according to the other data in the subgroup $1_A$ (e.g., the data stored in the consecutive storage regions 16-1A and 16-7A). The data stored in the consecutive storage region 16-4B of the storage unit 16-4 can be rebuilt or reconstructed according to the other data in the subgroup $1_B$ (e.g., the data stored in the consecutive storage regions 16-19 and 16-7B). The data stored in the consecutive storage region 16-4C of the storage unit 16-4 can be rebuilt or reconstructed according to the other data in the subgroup $1_C$ (e.g., the data stored in the consecutive storage regions 16-1C and 16-7C).

The data stored in the consecutive storage region 16-4D of the storage unit 16-4 can be rebuilt or reconstructed according to the other data in the subgroup $2_D$ (e.g., the data stored in the consecutive storage regions 16-2D and 16-9D). The data stored in the consecutive storage region 16-4E of the storage unit 16-4 can be rebuilt or reconstructed according to the other data in the subgroup $2_E$ (e.g., the data stored in the consecutive storage regions 16-2E and 16-9E). The data stored in the consecutive storage region 16-4F of the storage unit 16-4 can be rebuilt or reconstructed according to the other data in the subgroup $2_F$ (e.g., the data stored in the consecutive storage regions 16-2F and 16-9F).

The data stored in the consecutive storage region 16-4G of the storage unit 16-4 can be rebuilt or reconstructed according to the other data in the subgroup $3_G$ (e.g., the data stored in the consecutive storage regions 16-3G and 16-8G). The data stored in the consecutive storage region 16-4I of the storage unit 16-4 can be rebuilt or reconstructed according to the other data in the subgroup $3_H$ (e.g., the data stored in the consecutive storage regions 16-3H and 16-8H). The data stored in the consecutive storage region 16-4I of the storage unit 16-4 can be rebuilt or reconstructed according to the other data in the subgroup $3_I$ (e.g., the data stored in the consecutive storage regions 16-3I and 16-8I).

Referring to FIG. 5C, during the reconstruction process of a storage region (e.g., the storage region 16-4A) of a storage unit of one subarray (e.g., subarray 36B), only two storage units (e.g., the storage units 16-1 and 16-7) from the other two subarrays (e.g., subarrays 36A and 36C) need to be involved.

Figure 5D:
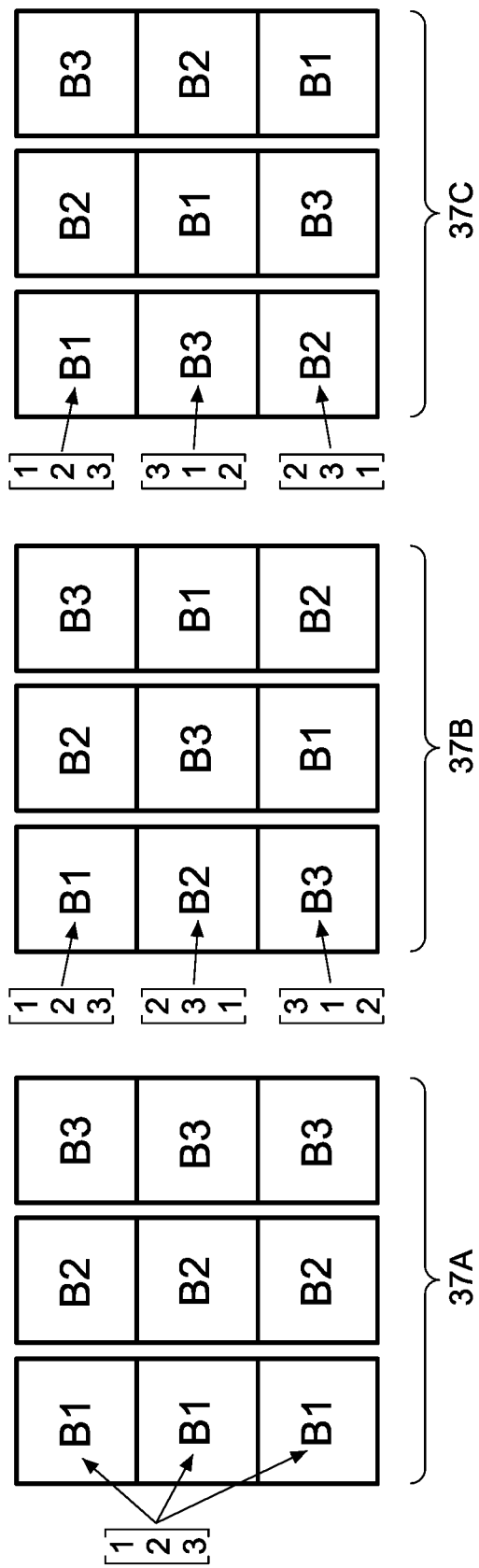
FIG. 5D is a schematic diagram illustrating a storage space configuration according to some embodiments of the subject application.

FIG. 5D is a schematic diagram illustrating a storage space configuration according to some embodiments of the subject application. FIG. 5D shows matrices 37A, 37B and 37C. The arrays B1, B2 and B3 discussed previously in accordance with FIG. 4A are utilized to expanding the number of storage units that could be used in accordance with the present disclosure.

Each of the matrices 37A, 37B and 37C includes several arrays B1, B2 and B3 arranged based on the mutual orthogonal Latin square set principle as illustrated in accordance with FIG. 4A. The items of the arrays B1, B2 and B3 are filled into the matrices 37A, 379 and 37C. That is, items $\{1, 2, 3\}^T$, $\{2, 3, 1\}^T$ and $\{3, 1, 2\}^T$ are filled into the matrices 37A, 379 and 37C.

Figure 5E:
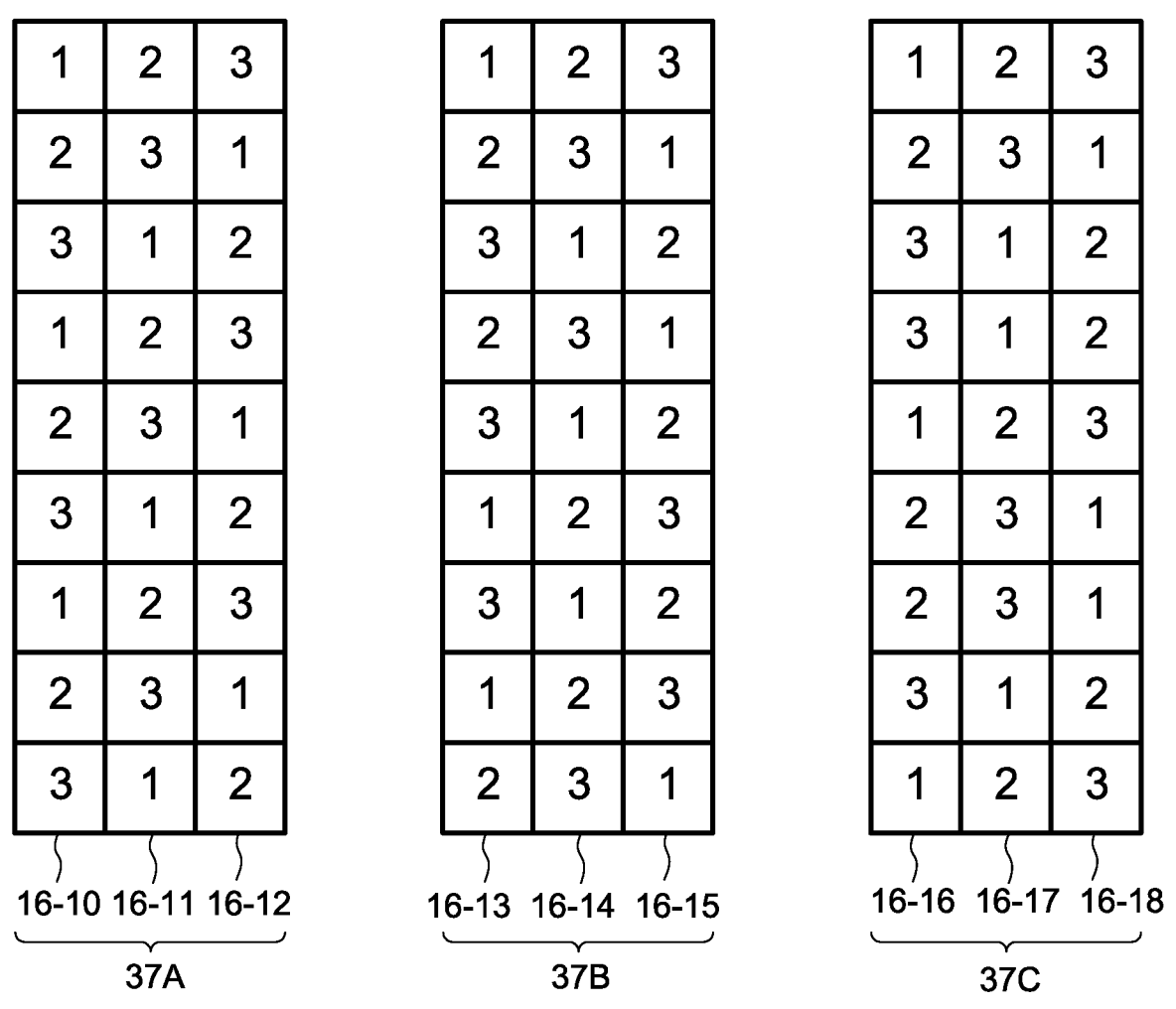

FIG. 5E is a schematic diagram illustrating a storage space configuration according to some embodiments of the subject application. After the items of the arrays B1, B2 and B3 are filled into the matrices 37A, 37B and 37C, a data allocation portfolio for nine storage units can be obtained. That is, data to be stored in the storage units 16-10 to 16-18 can follow the portfolio as shown in FIG. 5E. The matrices 37A, 37B and 37C may also be referred to as subarrays 37A, 37B and 37C.

Referring to FIG. 5E, the data to be stored in the storage units 16-10 to 16-18 are categorized as three data protection groups (labeled in FIG. 5E as numbers "1," "2" and "3"). The three data protection groups will be further categorized into subgroups, which will be described in the subsequent paragraphs.

Figure 5F:
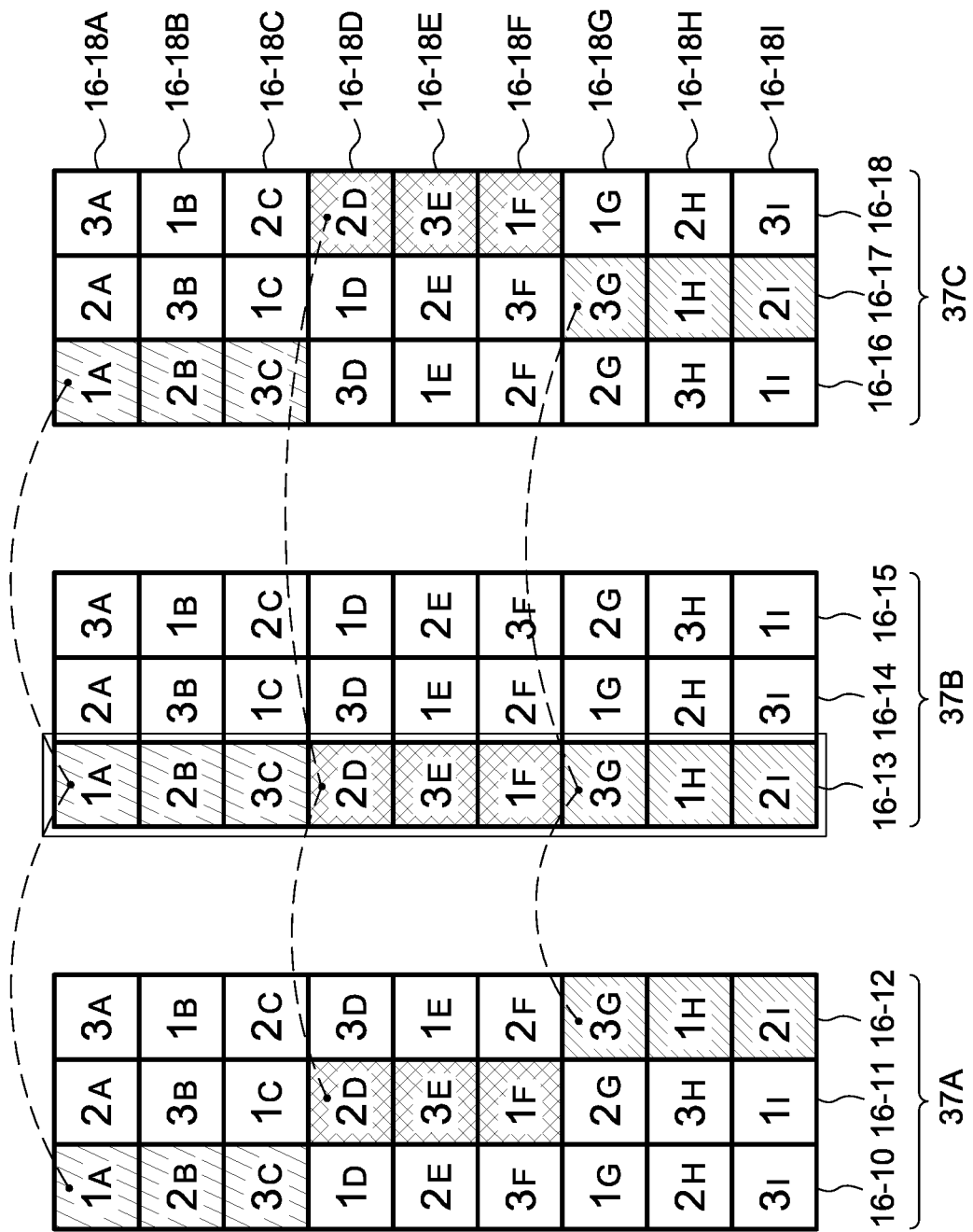
FIG. 5F is a schematic diagram illustrating a storage space configuration according to some embodiments of the subject application.

FIG. 5F is a schematic diagram illustrating a storage space configuration according to some embodiments of the subject application.

Although not labeled in FIG. 5F, the storage unit 16-10 includes consecutive storage regions 16-10A, 16-10B, 16-10C, 16-10D, 16-10E, 16-10F, 16-10G, 16-10H and 16-10I. The storage unit 16-11 includes consecutive storage regions 16-11A, 16-11B, 16-11C, 16-11D, 16-11E, 16-11F, 16-11G, 16-11H and 16-11I. The storage unit 16-12 includes consecutive storage regions 16-12A, 16-12B, 16-12C, 16-12D, 16-12E, 16-12F, 16-12G, 16-12H and 16-12I. The storage unit 16-13 includes consecutive storage regions 16-13A, 16-13B, 16-13C, 16-13D, 16-13E, 16-13F, 16-13G, 16-13H and 16-13I. The storage unit 16-14 includes consecutive storage regions 16-14A, 16-14B, 16-14C, 16-14D, 16-14E, 16-14F, 16-14G, 16-14H and 16-14I. The storage unit 16-15 includes consecutive storage regions 16-15A, 16-15B, 16-15C, 16-15D, 16-15E, 16-15F, 16-15G, 16-15H and 16-15I. The storage unit 16-16 includes consecutive storage regions 16-16A, 16-16B, 16-16C, 16-16D, 16-16E, 16-16F, 16-16G, 16-16H and 16-16I. The storage unit 16-17 includes consecutive storage regions 16-17A, 16-17B, 16-17C, 16-17D, 16-17E, 16-17F, 16-17G, 16-17H and 16-17I. The storage unit 16-18 includes consecutive storage regions 16-18A, 16-18B, 16-18C, 16-18D, 16-18E, 16-18F, 16-18G. 16-18H and 16-18I.

Referring to FIG. 5F, the data protection group "1" is further categorized into subgroups $1_A$, $1_B$, $1_C$, $1_D$, $1_E$, $1_F$, $1_G$, $1_H$ and $1_I$. The data protection group "2" is further categorized into subgroups $2_A$, $2_B$, $2_C$, $2_D$, $2_E$, $2_F$, $2_G$, $2_H$ and $2_I$. The data protection group "3" is further categorized into subgroups $3_A$, $3_B$, $3_C$, $3_D$, $3_E$, $3_F$, $3_G$, $3_H$ and $3_I$.

The data integrity protection in the subarrays 37A, 37B and 37C is implemented by subgroups. The data protection is provided across the data categorized as the same subgroup. For example, data protection is provided across the data categorized as subgroups $1_A$. Data protection is provided across the data categorized as subgroups $1_B$. Data protection is provided across the data categorized as subgroups $1_C$. Data protection is provided across the data categorized as subgroups $1_D$. Data protection is provided across the data categorized as subgroups $1_E$. Data protection is provided across the data categorized as subgroups $1_F$. Data protection is provided across the data categorized as subgroups $1_G$. Data protection is provided across the data categorized as subgroups $1_H$. Data protection is provided across the data categorized as subgroups $1_I$.

Similarly, data protection is provided across the data categorized as subgroups $2_A$. Data protection is provided across the data categorized as subgroups $2_B$. Data protection is provided across the data categorized as subgroups $2_C$. Data protection is provided across the data categorized as subgroups $2_D$. Data protection is provided across the data categorized as subgroups $2_E$. Data protection is provided across the data categorized as subgroups $2_F$. Data protection is provided across the data categorized as subgroups $2_G$. Data protection is provided across the data categorized as subgroups $2_H$. Data protection is provided across the data categorized as subgroups $2_I$.

Additionally, data protection is provided across the data categorized as subgroups $3_A$. Data protection is provided across the data categorized as subgroups $3_B$. Data protection is provided across the data categorized as subgroups $3_C$. Data protection is provided across the data categorized as subgroups $3_D$. Data protection is provided across the data categorized as subgroups $3_E$. Data protection is provided across the data categorized as subgroups $3_F$. Data protection is provided across the data categorized as subgroups $3_G$. Data protection is provided across the data categorized as subgroups $3_H$. Data protection is provided across the data categorized as subgroups $3_I$.

In some embodiments, one of the three data categorized as subgroup $1_A$ includes error correction data associated with the subgroup $1_A$. In some embodiments, one of the three data categorized as subgroup $1_B$ includes error correction data associated with the subgroup $1_B$. In some embodiments, one of the three data categorized as subgroup $1_C$ includes error correction data associated with the subgroup $1_C$. In some embodiments, one of the three data categorized as subgroup $1_D$ includes error correction data associated with the subgroup $1_D$. In some embodiments, one of the three data categorized as subgroup $1_E$ includes error correction data associated with the subgroup $1_E$. In some embodiments, one of the three data categorized as subgroup $1_F$ includes error correction data associated with the subgroup $1_F$. In some embodiments, one of the three data categorized as subgroup $1_G$ includes error correction data associated with the subgroup $1_G$. In some embodiments, one of the three data categorized as subgroup $1_H$ includes error correction data associated with the subgroup $1_H$. In some embodiments, one of the three data categorized as subgroup $1_I$ includes error correction data associated with the subgroup $1_I$.

In some embodiments, one of the three data categorized as subgroup $2_A$ includes error correction data associated with the subgroup $2_A$. In some embodiments, one of the three data categorized as subgroup $2_B$ includes error correction data associated with the subgroup $2_B$. In some embodiments, one of the three data categorized as subgroup $2_C$ includes error correction data associated with the subgroup $2_C$. In some embodiments, one of the three data categorized as subgroup $2_D$ includes error correction data associated with the subgroup $2_D$. In some embodiments, one of the three data categorized as subgroup $2_E$ includes error correction data associated with the subgroup $2_E$. In some embodiments, one of the three data categorized as subgroup $2_F$ includes error correction data associated with the subgroup $2_F$. In some embodiments, one of the three data categorized as subgroup $2_G$ includes error correction data associated with the subgroup $2_G$. In some embodiments, one of the three data categorized as subgroup $2_H$ includes error correction data associated with the subgroup $2_H$. In some embodiments, one of the three data categorized as subgroup $2_I$ includes error correction data associated with the subgroup $2_I$.

In some embodiments, one of the three data categorized as subgroup $3_A$ includes error correction data associated with the subgroup $3_A$. In some embodiments, one of the three data categorized as subgroup $3_B$ includes error correction data associated with the subgroup $3_B$. In some embodiments, one of the three data categorized as subgroup $3_C$ includes error correction data associated with the subgroup $3_C$. In some embodiments, one of the three data categorized as subgroup $3_D$ includes error correction data associated with the subgroup $3_D$. In some embodiments, one of the three data categorized as subgroup $3_E$ includes error correction data associated with the subgroup $3_E$. In some embodiments, one of the three data categorized as subgroup $3_F$ includes error correction data associated with the subgroup $3_F$. In some embodiments, one of the three data categorized as subgroup $3_G$ includes error correction data associated with the subgroup $3_G$. In some embodiments, one of the three data categorized as subgroup $3_H$ includes error correction data associated with the subgroup $3_H$. In some embodiments, one of the three data categorized as subgroup $3_I$ includes error correction data associated with the subgroup $3_I$.

Data categorized as different subgroups are not associated with each other. Data categorized as different subgroups are independent of each other.

If one of the data in a subgroup (e.g., subgroup $1_A$) is damaged or fail, the damaged data can be rebuilt or reconstructed according to the other data in the same subgroup.

For example, if the storage unit 16-13 fails or is damaged, the data stored in the consecutive storage region 16-13A of the storage unit 16-13 can be rebuilt or reconstructed according to the other data in the subgroup $1_A$ (e.g., the data stored in the consecutive storage regions 16-10A and 16-16A). The data stored in the consecutive storage region 16-13B of the storage unit 16-13 can be rebuilt or reconstructed according to the other data in the subgroup $2_B$ (e.g., the data stored in the consecutive storage regions 16-10B and 16-16B). The data stored in the consecutive storage region 16-13C of the storage unit 16-13 can be rebuilt or reconstructed according to the other data in the subgroup $3_C$ (e.g., the data stored in the consecutive storage regions 16-10C and 16-16C).

The data stored in the consecutive storage region 16-13D of the storage unit 16-13 can be rebuilt or reconstructed according to the other data in the subgroup $2_D$ (e.g., the data stored in the consecutive storage regions 16-11D and 16-18D). The data stored in the consecutive storage region 16-13E of the storage unit 16-13 can be rebuilt or reconstructed according to the other data in the subgroup $3_E$ (e.g., the data stored in the consecutive storage regions 16-11E and 16-18E). The data stored in the consecutive storage region 16-13F of the storage unit 16-13 can be rebuilt or reconstructed according to the other data in the subgroup $1_F$ (e.g., the data stored in the consecutive storage regions 16-11F and 16-18F).

The data stored in the consecutive storage region 16-13G of the storage unit 16-13 can be rebuilt or reconstructed according to the other data in the subgroup $3_G$ (e.g., the data stored in the consecutive storage regions 16-12G and 16-17G). The data stored in the consecutive storage region 16-13H of the storage unit 16-13 can be rebuilt or reconstructed according to the other data in the subgroup $1_H$ (e.g., the data stored in the consecutive storage regions 16-12H and 16-17H). The data stored in the consecutive storage region 16-13I of the storage unit 16-13 can be rebuilt or reconstructed according to the other data in the subgroup $2_I$ (e.g., the data stored in the consecutive storage regions 16-12I and 16-17I).

Referring to FIG. 5F, during the reconstruction process of a storage region (e.g., the storage region 16-13A) of a storage unit of one subarray (e.g., subarray 37B), only two storage units (e.g., the storage units 16-10 and 16-16) from the other two subarrays (e.g., subarrays 37A and 37C) need to be involved.

Figure 5G:
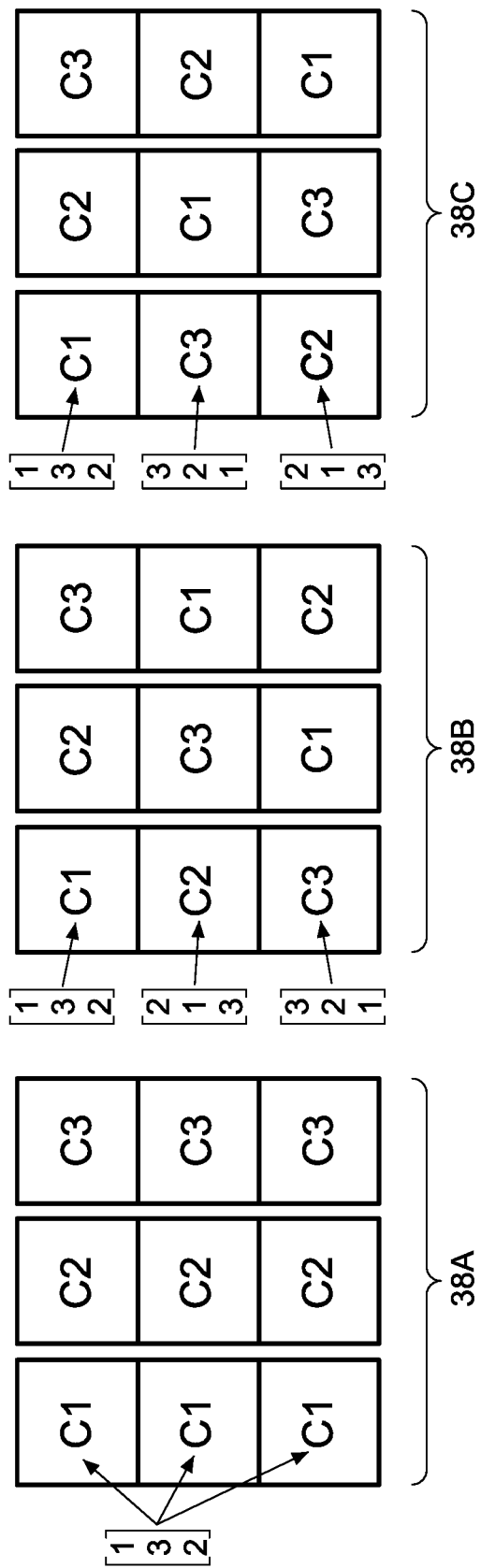
FIG. 5G is a schematic diagram illustrating a storage space configuration according to some embodiments of the subject application.

FIG. 5G is a schematic diagram illustrating a storage space configuration according to some embodiments of the subject application. FIG. 5E shows matrices 38A, 38B and 38C. The arrays C1, C2 and C3 discussed previously in accordance with FIG. 4A are utilized to expanding the number of storage units that could be used in an array in accordance with the present disclosure.

Each of the matrices 38A. 38B and 38C includes several arrays C1, C2 and C3 arranged based on the mutual orthogonal Latin square set principle as illustrated in accordance with FIG. 4A. The items of the arrays C1, C2 and C3 are filled into the matrices 38A, 38B and 38C. That is, items $\{1, 3, 2\}^T$, $\{2, 1, 3\}^T$ and $\{3, 2, 1\}^T$ are filled into the matrices 38A, 38B and 38C.

FIG. 5H is a schematic diagram illustrating a storage space configuration according to some embodiments of the subject application. After the items of the arrays C1, C2 and C3 are filled into the matrices 38A, 38B and 38C, a data allocation portfolio for nine storage units can be obtained. That is, data to be stored in the storage units 16-19 to 16-27 can follow the portfolio as shown in FIG. 5H. The matrices 38A, 38B and 38C may also be referred to as subarrays 38A, 38B and 38C.

Referring to FIG. 5H, the data to be stored in the storage units 16-19 to 16-27 are categorized as three data protection groups (labeled in FIG. 5H as numbers "1," "2" and "3"). The three data protection groups will be further categorized into subgroups, which will be described in the subsequent paragraphs.

Figure 5I:
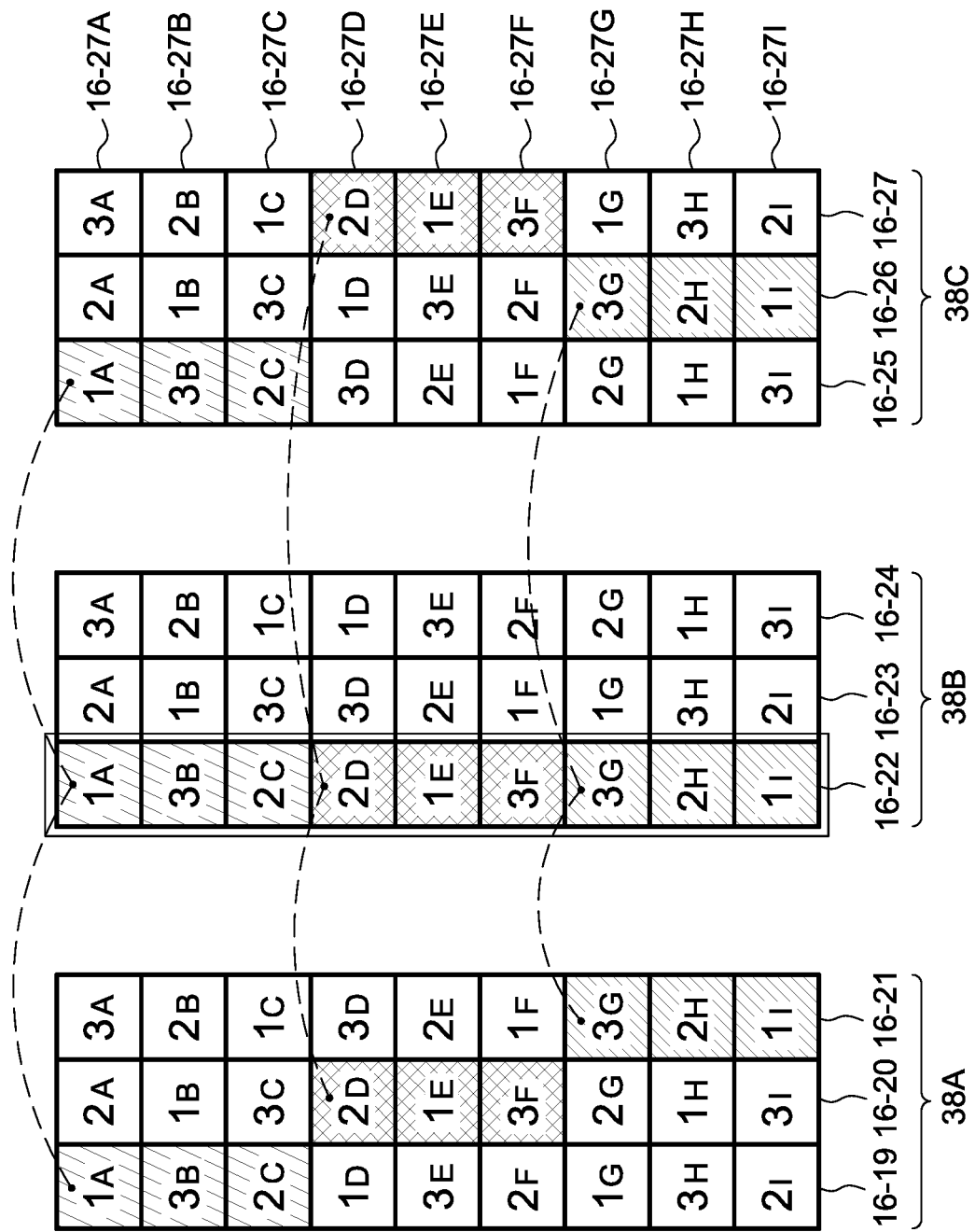
FIG. 5I is a schematic diagram illustrating a storage space configuration according to some embodiments of the subject application.

FIG. 5I is a schematic diagram illustrating a storage space configuration according to some embodiments of the subject application.

Although not labeled in FIG. 5I, the storage unit 16-19 includes consecutive storage regions 16-19A, 16-19B, 16-19C, 16-19D, 16-19E, 16-19F, 16-19G, 16-19H and 16-19I. The storage unit 16-20 includes consecutive storage regions 16-20A, 16-20B, 16-20C, 16-20D, 16-20E, 16-20F, 16-20G, 16-20H and 16-20I. The storage unit 16-21 includes consecutive storage regions 16-21A, 16-21B, 16-21C, 16-21D, 16-21E, 16-21F, 16-21G, 16-21H and 16-21I. The storage unit 16-22 includes consecutive storage regions 16-22A, 16-22B, 16-22C, 16-22D, 16-22E, 16-22F, 16-22G, 16-22H and 16-22I. The storage unit 16-23 includes consecutive storage regions 16-23A, 16-23B, 16-23C, 16-23D, 16-23E, 16-23F, 16-23H and 16-23I. The storage unit 16-24 includes consecutive storage regions 16-24A, 16-24B, 16-24C, 16-24D, 16-24E, 16-24F, 16-24G, 16-24H and 16-24I. The storage unit 16-25 includes consecutive storage regions 16-25A, 16-25B, 16-25C, 16-25D, 16-25E, 16-25F, 16-25G, 16-25H and 16-25I. The storage unit 16-26 includes consecutive storage regions 16-26A, 16-26B, 16-26C, 16-26D, 16-26E, 16-26F, 16-26G, 16-26H and 16-26I. The storage unit 16-27 includes consecutive storage regions 16-27A, 16-27B, 16-27C, 16-27D, 16-27E, 16-27F, 16-27G, 16-27H and 16-27I.

Referring to FIG. 5I, the data protection group "1" is further categorized into subgroups $1_A$, $1_B$, $1_C$, $1_D$, $1_E$, $1_F$, $1_G$, $1_{H1}$ and $1_I$. The data protection group "2" is further categorized into subgroups $2_A$, $2_B$, $2_C$, $2_D$, $2_E$, $2_F$, $2_G$, $2_H$ and $2_I$. The data protection group "3" is further categorized into subgroups $3_A$, $3_B$, $3_C$, $3_D$, $3_E$, $3_F$, $3_G$, $3_H$ and $3_I$.

The data integrity protection in the subarrays 38A, 38B and 38C is implemented by subgroups. The data protection is provided across the data categorized as the same subgroup. For example, data protection is provided across the data categorized as subgroups $1_A$. Data protection is provided across the data categorized as subgroups $1_B$. Data protection is provided across the data categorized as subgroups $1_C$. Data protection is provided across the data categorized as subgroups $1_D$. Data protection is provided across the data categorized as subgroups $1_E$. Data protection is provided across the data categorized as subgroups $1_F$. Data protection is provided across the data categorized as subgroups $1_G$. Data protection is provided across the data categorized as subgroups $1_H$. Data protection is provided across the data categorized as subgroups $1_I$.

Similarly, data protection is provided across the data categorized as subgroups $2_A$. Data protection is provided across the data categorized as subgroups $2_B$. Data protection is provided across the data categorized as subgroups $2_C$. Data protection is provided across the data categorized as subgroups $2_D$. Data protection is provided across the data categorized as subgroups $2_E$. Data protection is provided across the data categorized as subgroups $2_F$. Data protection is provided across the data categorized as subgroups $2_G$. Data protection is provided across the data categorized as subgroups $2_H$. Data protection is provided across the data categorized as subgroups $2_I$.

Additionally, data protection is provided across the data categorized as subgroups $3_A$. Data protection is provided across the data categorized as subgroups $3_B$. Data protection is provided across the data categorized as subgroups $3_C$. Data protection is provided across the data categorized as subgroups $3_D$. Data protection is provided across the data categorized as subgroups $3_E$. Data protection is provided across the data categorized as subgroups $3_F$. Data protection is provided across the data categorized as subgroups $3_G$. Data protection is provided across the data categorized as subgroups $3_H$. Data protection is provided across the data categorized as subgroups $3_I$.

In some embodiments, one of the three data categorized as subgroup $1_A$ includes error correction data associated with the subgroup $1_A$. In some embodiments, one of the three data categorized as subgroup $1_B$ includes error correction data associated with the subgroup $1_B$. In some embodiments, one of the three data categorized as subgroup $1_C$ includes error correction data associated with the subgroup $1_C$. In some embodiments, one of the three data categorized as subgroup $1_D$ includes error correction data associated with the subgroup $1_D$. In some embodiments, one of the three data categorized as subgroup $1_E$ includes error correction data associated with the subgroup $1_E$. In some embodiments, one of the three data categorized as subgroup $1_F$ includes error correction data associated with the subgroup $1_F$. In some embodiments, one of the three data categorized as subgroup $1_G$ includes error correction data associated with the subgroup $1_G$. In some embodiments, one of the three data categorized as subgroup $1_H$ includes error correction data associated with the subgroup $1_H$. In some embodiments, one of the three data categorized as subgroup $1_I$ includes error correction data associated with the subgroup $1_I$.

In some embodiments, one of the three data categorized as subgroup $2_A$ includes error correction data associated with the subgroup $2_A$. In some embodiments, one of the three data categorized as subgroup $2_B$ includes error correction data associated with the subgroup $2_B$. In some embodiments, one of the three data categorized as subgroup $2_C$ includes error correction data associated with the subgroup $2_C$. In some embodiments, one of the three data categorized as subgroup $2_D$ includes error correction data associated with the subgroup $2_D$. In some embodiments, one of the three data categorized as subgroup $2_E$ includes error correction data associated with the subgroup $2_E$. In some embodiments, one of the three data categorized as subgroup $2_F$ includes error correction data associated with the subgroup $2_F$. In some embodiments, one of the three data categorized as subgroup $2_G$ includes error correction data associated with the subgroup $2_C$ In some embodiments, one of the three data categorized as subgroup $2_H$ includes error correction data associated with the subgroup $2_H$. In some embodiments, one of the three data categorized as subgroup $2_I$ includes error correction data associated with the subgroup $2_I$.

In some embodiments, one of the three data categorized as subgroup $3_A$ includes error correction data associated with the subgroup $3_A$. In some embodiments, one of the three data categorized as subgroup $3_B$ includes error correction data associated with the subgroup $3_B$. In some embodiments, one of the three data categorized as subgroup $3_C$ includes error correction data associated with the subgroup $3_C$. In some embodiments, one of the three data categorized as subgroup $3_D$ includes error correction data associated with the subgroup $3_D$. In some embodiments, one of the three data categorized as subgroup $3_E$ includes error correction data associated with the subgroup $3_E$. In some embodiments, one of the three data categorized as subgroup $3_F$ includes error correction data associated with the subgroup $3_F$. In some embodiments, one of the three data categorized as subgroup $3_G$ includes error correction data associated with the subgroup $3_G$. In some embodiments, one of the three data categorized as subgroup $3_H$ includes error correction data associated with the subgroup $3_H$. In some embodiments, one of the three data categorized as subgroup $3_I$ includes error correction data associated with the subgroup $3_I$.

Data categorized as different subgroups are not associated with each other. Data categorized as different subgroups are independent of each other.

If one of the data in a subgroup (e.g., subgroup $1_A$) is damaged or fail, the damaged data can be rebuilt or reconstructed according to the other data in the same subgroup.

For example, if the storage unit 16-22 fails or is damaged, the data stored in the consecutive storage region 16-22A of the storage unit 16-22 can be rebuilt or reconstructed according to the other data in the subgroup $1_A$ (e.g., the data stored in the consecutive storage regions 16-19A and 16-25A). The data stored in the consecutive storage region 16-22B of the storage unit 16-22 can be rebuilt or reconstructed according to the other data in the subgroup $3_B$ (e.g., the data stored in the consecutive storage regions 16-19B and 16-25B). The data stored in the consecutive storage region 16-22C of the storage unit 16-22 can be rebuilt or reconstructed according to the other data in the subgroup $2_C$ (e.g., the data stored in the consecutive storage regions 16-19C and 16-25C).

The data stored in the consecutive storage region 16-22D of the storage unit 16-22 can be rebuilt or reconstructed according to the other data in the subgroup $2_D$ (e.g., the data stored in the consecutive storage regions 16-20D and 16-27D). The data stored in the consecutive storage region 16-22E of the storage unit 16-22 can be rebuilt or reconstructed according to the other data in the subgroup $1_E$ (e.g., the data stored in the consecutive storage regions 16-20E and 16-27E). The data stored in the consecutive storage region 16-22F of the storage unit 16-22 can be rebuilt or reconstructed according to the other data in the subgroup $3_F$ (e.g., the data stored in the consecutive storage regions 16-20F and 16-27F).

The data stored in the consecutive storage region 16-22G of the storage unit 16-22 can be rebuilt or reconstructed according to the other data in the subgroup $3_G$ (e.g., the data stored in the consecutive storage regions 16-21G and 16-26G). The data stored in the consecutive storage region 16-22H of the storage unit 16-22 can be rebuilt or reconstructed according to the other data in the subgroup $2_H$ (e.g., the data stored in the consecutive storage regions 16-21H and 16-26H). The data stored in the consecutive storage region 16-22I of the storage unit 16-22 can be rebuilt or reconstructed according to the other data in the subgroup $1_I$ (e.g., the data stored in the consecutive storage regions 16-21I and 16-26I).

Referring to FIG. 5I, during the reconstruction process of a storage region (e.g., the storage region 16-22A) of a storage unit of one subarray (e.g., subarray 38B), only two storage units (e.g., the storage units 16-19 and 16-25) from the other two subarrays (e.g., subarrays 38A and 38C) need to be involved.

Figure 5J:
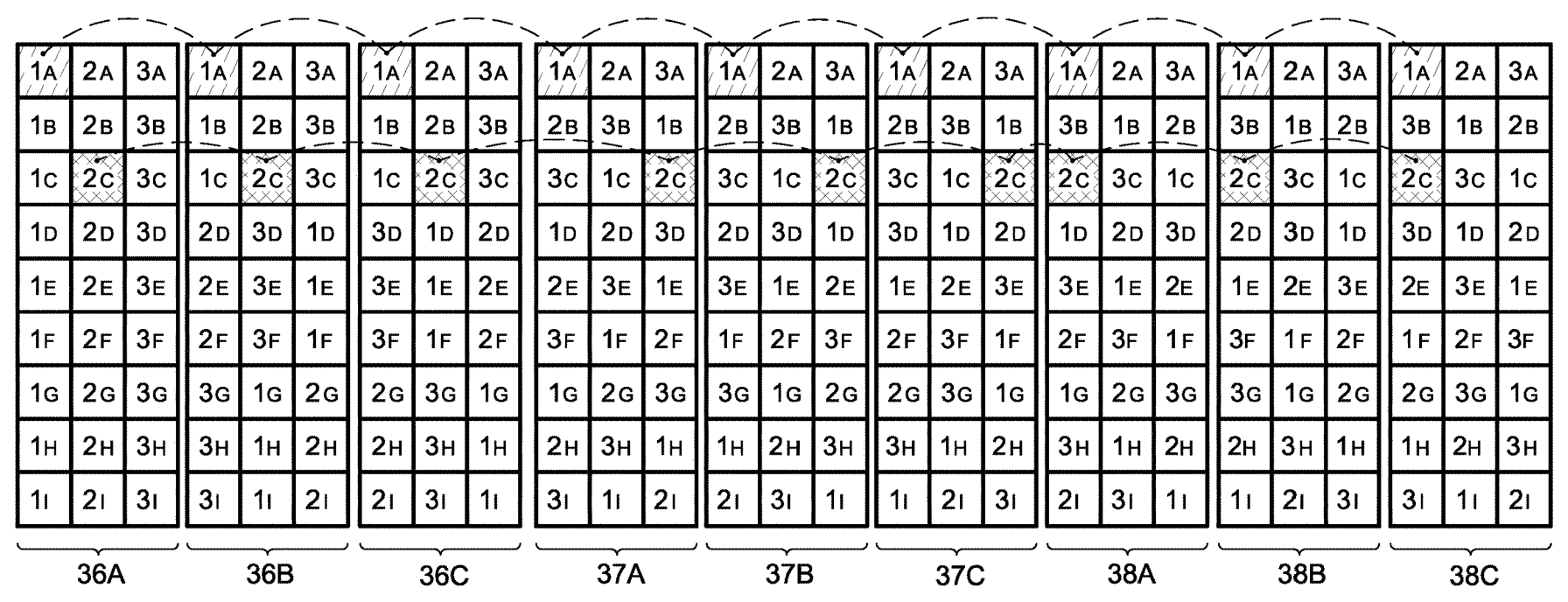

FIG. 5J is a schematic diagram illustrating a storage space configuration according to some embodiments of the subject application. The subarrays 36A, 36B, 36C, 37A, 37B, 37C, 38A, 38B and 38C previously discussed can be combined to form a bigger data allocation portfolio.

As shown in FIG. 5J, the combination of the subarrays 36A, 36B, 36C, 37A, 37B, 37C, 38A, 38B and 38C provides a data allocation portfolio for up to 27 storage units (e.g., storage units 16-1 to 16-27).

The data integrity protection in the 27 storage units is implemented by subgroups. The data protection is provided across the data categorized as the same subgroup. For example, data protection is provided across the data categorized as subgroups $1_A$. Data protection is provided across the data categorized as subgroups $1_B$. Data protection is provided across the data categorized as subgroups $1_C$. Data protection is provided across the data categorized as subgroups $1_D$. Data protection is provided across the data categorized as subgroups $1_E$. Data protection is provided across the data categorized as subgroups $1_G$. Data protection is provided across the data categorized as subgroups $1_G$. Data protection is provided across the data categorized as subgroups $1_H$. Data protection is provided across the data categorized as subgroups $1_I$.

Similarly, data protection is provided across the data categorized as subgroups $2_A$. Data protection is provided across the data categorized as subgroups $2_B$. Data protection is provided across the data categorized as subgroups $2_C$. Data protection is provided across the data categorized as subgroups $2_D$. Data protection is provided across the data categorized as subgroups $2_E$. Data protection is provided across the data categorized as subgroups $2_F$. Data protection is provided across the data categorized as subgroups $2_G$. Data protection is provided across the data categorized as subgroups $2_H$. Data protection is provided across the data categorized as subgroups $2_I$.

Additionally, data protection is provided across the data categorized as subgroups $3_A$. Data protection is provided across the data categorized as subgroups $3_B$. Data protection is provided across the data categorized as subgroups $3_C$. Data protection is provided across the data categorized as subgroups $3_D$. Data protection is provided across the data categorized as subgroups $3_E$. Data protection is provided across the data categorized as subgroups $3_F$. Data protection is provided across the data categorized as subgroups $3_G$. Data protection is provided across the data categorized as subgroups $3_H$. Data protection is provided across the data categorized as subgroups $3_I$.

In some embodiments, one of the nine data categorized as subgroup $1_A$ includes error correction data associated with the subgroup $1_A$. In some embodiments, one of the nine data categorized as subgroup $1_B$ includes error correction data associated with the subgroup $1_B$. In some embodiments, one of the nine data categorized as subgroup $1_C$ includes error correction data associated with the subgroup $1_C$. In some embodiments, one of the nine data categorized as subgroup $1_D$ includes error correction data associated with the subgroup $1_D$. In some embodiments, one of the nine data categorized as subgroup $1_E$ includes error correction data associated with the subgroup $1_E$. In some embodiments, one of the nine data categorized as subgroup $1_F$ includes error correction data associated with the subgroup $1_F$. In some embodiments, one of the nine data categorized as subgroup $1_G$ includes error correction data associated with the subgroup $1_G$. In some embodiments, one of the nine data categorized as subgroup $1_H$ includes error correction data associated with the subgroup $1_H$. In some embodiments, one of the nine data categorized as subgroup $1_I$ includes error correction data associated with the subgroup $1_I$.

In some embodiments, one of the nine data categorized as subgroup $2_A$ includes error correction data associated with the subgroup $2_A$. In some embodiments, one of the nine data categorized as subgroup $2_B$ includes error correction data associated with the subgroup $2_B$. In some embodiments, one of the nine data categorized as subgroup $2_C$ includes error correction data associated with the subgroup $2_C$. In some embodiments, one of the nine data categorized as subgroup $2_D$ includes error correction data associated with the subgroup $2_D$. In some embodiments, one of the nine data categorized as subgroup $2_E$ includes error correction data associated with the subgroup $2_E$. In some embodiments, one of the nine data categorized as subgroup $2_F$ includes error correction data associated with the subgroup $2_F$. In some embodiments, one of the nine data categorized as subgroup $2_G$ includes error correction data associated with the subgroup $2_G$ in some embodiments, one of the nine data categorized as subgroup $2_H$ includes error correction data associated with the subgroup $2_H$. In some embodiments, one of the nine data categorized as subgroup $2_I$ includes error correction data associated with the subgroup $2_I$.

In some embodiments, one of the nine data categorized as subgroup $3_A$ includes error correction data associated with the subgroup $3_A$. In some embodiments, one of the nine data categorized as subgroup $3_B$ includes error correction data associated with the subgroup $3_B$. In some embodiments, one of the nine data categorized as subgroup $3_C$ includes error correction data associated with the subgroup $3_C$. In some embodiments, one of the nine data categorized as subgroup $3_D$ includes error correction data associated with the subgroup $3_D$. In some embodiments, one of the nine data categorized as subgroup $3_E$ includes error correction data associated with the subgroup $3_E$. In some embodiments, one of the nine data categorized as subgroup $3_F$ includes error correction data associated with the subgroup $3_E$. In some embodiments, one of the nine data categorized as subgroup $3_G$ includes error correction data associated with the subgroup $3_G$. In some embodiments, one of the nine data categorized as subgroup $3_H$ includes error correction data associated with the subgroup $3_H$. In some embodiments, one of the nine data categorized as subgroup $3_I$ includes error correction data associated with the subgroup $3_I$.

Data categorized as different subgroups are not associated with each other. Data categorized as different subgroups are independent of each other.

If one of the data in a subgroup is damaged or fail, the damaged data can be rebuilt or reconstructed according to the other data in the same subgroup. For example, if the data stored in the storage region 16-1A of the storage unit 16-1 (e.g., the subgroup $1_A$) is damaged or fail, the damaged data can be rebuilt or reconstructed according to the data stored in the storage regions 16-4A, 16-7A, 16-10A, 16-13A, 16-16A, 16-19A, 16-22A and 16-25A of the storage units 16-4, 16-7, 16-10, 16-13, 16-16, 16-19, 16-22 and 16-25.

Similarly, if the data stored in the storage region 16-2C of the storage unit 16-2 (e.g., the subgroup $2_C$) is damaged or fail, the damaged data can be rebuilt or reconstructed according to the data stored in the storage regions 16-5C, 16-8C, 16-12C, 16-15C, 16-18C, 16-19C, 16-22C and 16-25C of the storage units 16-5, 16-8, 16-12, 16-15, 16-18, 16-19, 16-22 and 16-25.

When a storage region (e.g., the storage region 16-6A) of one storage unit from one of the subarrays (e.g., subarray 36B) needs to be rebuilt, one storage region (e.g., storage regions 16-3A, 16-9A, 16-12A, 16-15A, 16-18A, 16-21A, 16-24A and 16-27A) each from the subarrays 36A, 36C, 37A, 37B, 37C, 38A, 38B and 38C are involved. Only ⅓ of each storage unit is involved with data reconstruction, and the rebuild speed would be 3 times comparing with FIG. 2.

Using the method as illustrated in accordance with FIGS. 5A to 5J, different data allocation mechanisms can be obtained fir different number of storage units, including a ranging from $N^2$ storage units to $N^3$ storage units. In some embodiments, a data allocation mechanism for up to 64 storage units can be obtained based on an order four (that is, matrix with a dimension 4×4) mutual orthogonal Latin square set, and the rebuilding speed would be 4 times comparing with FIG. 2. In some embodiments, a data allocation mechanism for up to 125 storage units can be obtained based on an order five (that is, matrix with a dimension 5×5) mutual orthogonal Latin square set, and the rebuilding speed would be 5 times comparing with FIG. 2.

In some embodiments, a data allocation mechanism for total $N^2$ storage units can be obtained based on an order N (that is, matrix with a dimension N×N) mutual orthogonal Latin square set, and the rebuilding speed would be N times comparing with FIG. 2.

In some embodiments, a data allocation mechanism for total $N^3$ storage units can be obtained by using array as elements in order N (that is, matrix with a dimension N×N) mutual orthogonal Latin square set, and the rebuilding speed would be N times comparing with FIG. 2.

Figure 6:
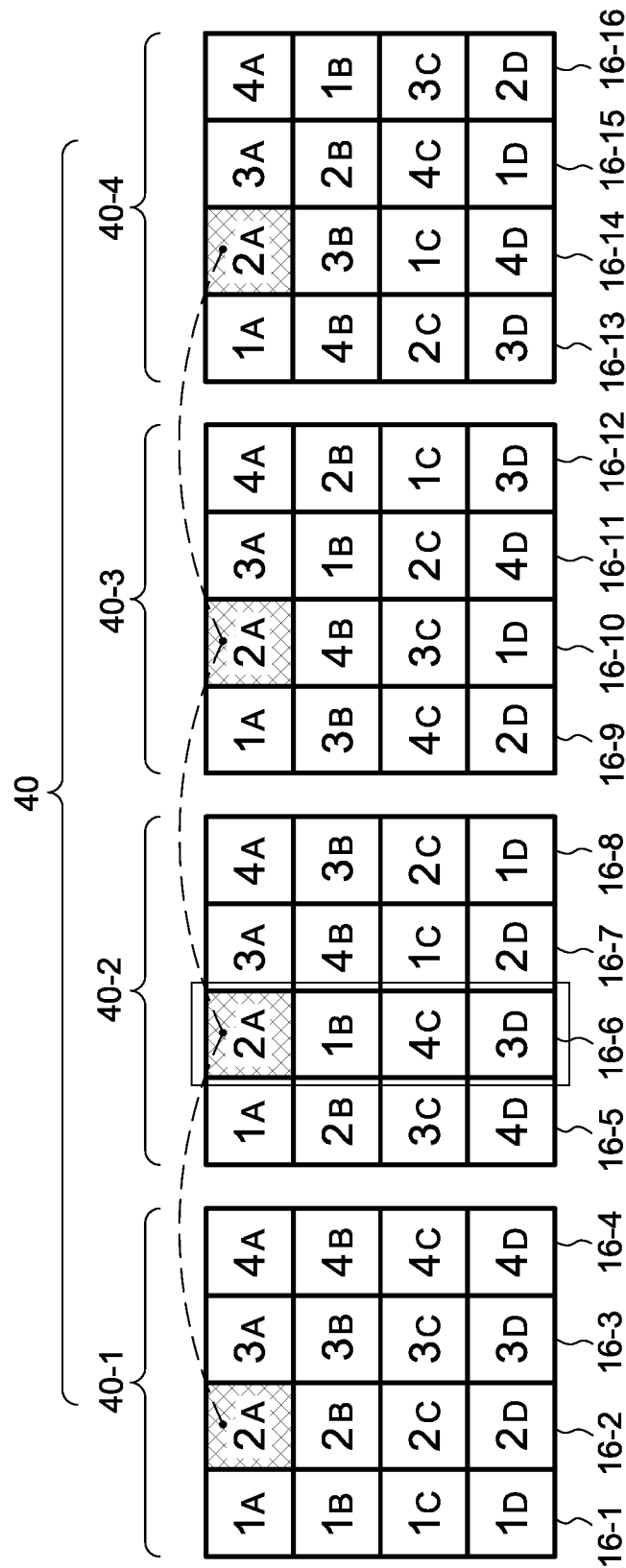
FIG. 6 is a schematic diagram illustrating a storage space configuration according to some embodiments of the subject application.

FIG. 6 is a schematic diagram illustrating a storage space configuration according to some embodiments of the subject application. The data allocation mechanism is derived based on an order four (that is, matrix with a dimension 4×4) mutual orthogonal Latin square set.

The storage space configuration shown in FIG. 6 is applied to an array 40 including 16 storage units. In the embodiment shown in FIG. 6, the storage units of the array 40 are grouped into subarrays 40-1, 40-2, 40-3 and 40-4. Each of the subarrays includes four storage units and each of the storage units includes a plurality of storage regions. In the embodiment shown in FIG. 6, each of the storage units includes four storage regions. In can be contemplated that more or less storage regions can be allocated in each of the storage units.

As shown in FIG. 6, data to be stored in the storage units of the subarrays 40-1, 40-2, 40-3 and 40-4 are categorized into four data protection groups "1," "2," "3" and "4." The data protection group "1" is further categorized into subgroups $1_A$, $1_B$, $1_C$ and $1_D$. The data protection group "2" is further categorized into subgroups $2_A$, $2_B$, $2_C$ and $2_D$. The data protection group "3" is further categorized into subgroups $3_A$, $3_B$, $3_C$ and $3_D$. The data protection group "4" is further categorized into subgroups $4_A$, $4_B$, $4_C$ and $4_D$.

The data integrity protection in the array 40 is implemented by subgroups. The data protection is provided across the data categorized as the same subgroup. For example, data protection is provided across the data categorized as subgroup $1_A$. Data protection is provided across the data categorized as subgroup $1_B$. Data protection is provided across the data categorized as subgroup $1_C$. Data protection is provided across the data categorized as subgroup $1_D$.

Data protection is provided across the data categorized as subgroup $2_A$. Data protection is provided across the data categorized as subgroup $2_B$. Data protection is provided across the data categorized as subgroup $2_C$. Data protection is provided across the data categorized as subgroup $2_D$.

Similarly, data protection is provided across the data categorized as subgroup $3_A$. Data protection is provided across the data categorized as subgroup $3_B$. Data protection is provided across the data categorized as subgroup $3_C$. Data protection is provided across the data categorized as subgroup $3_B$. Data protection is provided across the data categorized as subgroup $3_D$.

Data integrity protection and the reconstruction process for the data to be stored in the array 40 are identical to those previously discussed in accordance with FIGS. 4, 5C, 5F and 5I.

During the reconstruction process of a storage region of a storage unit of one subarray, three storage units from the other three subarrays need to be involved. Referring to FIG. 6, assuming that the data stored in the storage region 16-6A of the storage unit 16-6 from the subarray 40-2 needs to be rebuilt, the data stored in the corresponding storage regions (e.g., the storage regions 16-2A, 16-6A, 16-10A and 16-14A) form the subarrays 40-1, 40-3 and 40-4 are used. The data stored in all the storage units in the array 40 can be reconstructed using the same manner.

In the data allocation mechanism shown in FIG. 6, the work loading for rebuilding a failed storage unit within a subarray is shared by storage units belonging to other subarrays. Sharing work loading of the data reconstruction process by all the storage units increases the lifetime of each of the storage units within the array 40. In addition, following the data allocation mechanism as shown in FIG. 6, the speed of the data reconstruction process can be increased by four times compared to that of FIG. 2.

Specifically, each of the storage units participate in the data reconstruction process only needs to offer 25% of its data, it can be expected that the time spent on reading data from the storage units participate in the data reconstruction process is reduced 75%. For example, the storage 16-2 only offers 25% of its data during the data reconstruction of the storage unit 16-6. Similarly, the storage units 16-10 and 16-14 only offer 25% of their data during the data reconstruction of the storage unit 16-6. The speed of data reconstruction process for every storage unit of the array 40 is then increased by four tunes compared to that of FIG. 2.

FIG. 6A is a schematic diagram illustrating a storage space configuration according to some embodiments of the subject application. The data allocation mechanism is derived based on an order four (that is, matrix with a dimension 4×4) mutual orthogonal Latin square set. Different from the data allocation mechanism as shown in FIG. 6, the number of storage units in each subarrays may not be identical.

In the embodiment shown in FIG. 6A, the storage units of the array 42 are grouped into subarrays 42-1, 42-2, 42-3 and 42-4. Each of the subarrays 42-1, 42-2 and 42-3 includes four storage units, while the subarray 42-4 includes two storage units. Each of the storage units includes a plurality of storage regions. In the embodiment shown in FIG. 6A, each of the storage units includes four storage regions. It can be contemplated that more or less storage regions can be allocated in each of the storage units.

Data integrity protection and the reconstruction process for the data to be stored in the array 42 are identical to those previously discussed in accordance with FIGS. 4, 5C, 5F and 5I. Although the total number of storage units in the array 42 is reduced, the data protection ability of the array 42 remains unchanged. In addition, the speed of data reconstruction process for every storage unit of the array 42 is also increased by four times compared to that of FIG. 2.

Figure 7:
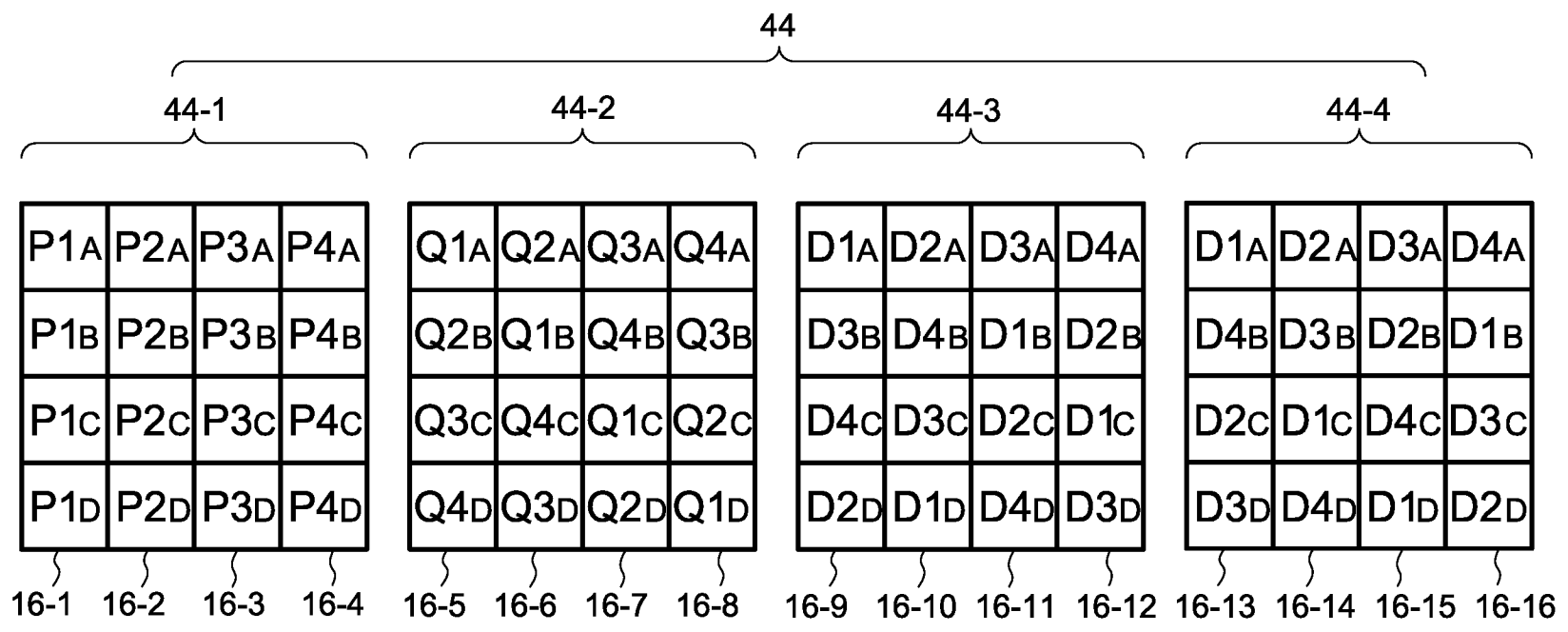

FIG. 7 is a schematic diagram illustrating data allocation portfolio according to some embodiments of the subject application. The array 44 includes 16 storage units grouped into subarrays 44-1, 44-2, 44-3 and 44-4. The data allocation portfolio for the array 44 is the same as that shown in FIG. 6, which utilizes an order four of orthogonal Latin square set.

Referring to FIG. 7, the data stored in the storage units 16-1, 16-2, 16-3 and 16-4 of the subarray 44-1 are first kind of error correction data (that is, data $P1_A$, $P1_B$, $P1_C$, $P1_D$, $P2_A$, $P2_B$, $P2_C$, $P2_D$, $P3_A$, $P3_B$, $P3_C$, $P3_D$, $P4_A$, $P4_B$, $P4_C$ and $P4_D$). The data stored in the storage units 16-5, 16-6, 16-7 and 16-8 of the subarray 44-2 are second kind of error correction data (that is, data $Q1_A$, $Q1_B$, $Q1_C$, $Q1_D$, $Q2_A$, $Q2_B$, $Q2_C$, $Q2_D$, $Q3_A$, $Q3_B$, $Q3_C$, $Q3_D$, $Q4_A$, $Q4_B$, $Q4_C$ and $Q4_D$). All the storage units of the subarrays 44-3 and 44-4 are used to store user data or client data (that is, data $D1_A$, $D1_B$, $D1_C$, $D1_D$, $D2_A$, $D2_B$, $D2_C$, $D2_D$, $D3_A$, $D3_B$, $D3_C$, $D3_D$, $D4_A$, $D4_B$, $D4_C$ and $D4_D$) received from an external device (for example, the client hosts 14 shown in FIG. 1).

Referring to FIG. 7, the data stored in the subarray 44-1 are error correction data associated with the client data stored in the subarrays 44-3 and 44-4.

The data $P1_A$ is error correction data associated with the client data $D1_A$. The data $P1_B$ is error correction data associated with the client data $D1_B$. The data $P1_C$ is error correction data associated with the client data $D1_C$. The data $P1_D$ is error correction data associated with the client data $D1_D$.

The data. $P2_A$ is error correction data associated with the client data. $D2_A$. The data $P2_B$ is error correction data associated with the client data $D2_B$. The data $P2_C$ is error correction data associated with the client data $D2_C$. The data $P2_D$ is error correction data associated with the client data $D2_D$.

The data $P3_A$ is error correction data associated with the client data $D3_A$. The data $P3_B$ is error correction data associated with the client data $D3_B$. The data $P3_C$ is error correction data associated with the client data $D3_C$. The data $P3_D$ is error correction data associated with the client data $D3_D$.

The data $P4_A$ is error correction data associated with the client data $D4_A$. The data $P4_B$ is error correction data associated with the client data $D4_B$. The data $P4_C$ is error correction data associated with the client data $D4_C$. The data $P4_D$ is error correction data associated with the client data $D4_D$.

Data categorized as different subgroups are not associated with each other. Data categorized as different subgroups are independent of each other.

Referring to FIG. 7, the data stored in the subarray 44-2 are error correction data associated with the client data stored in the subarrays 44-3 and 44-4.

The data $Q1_A$ is error correction data associated with the client data $D1_A$. The data $Q1_B$ is error correction data associated with the client data $D1_B$. The data $Q1_C$ is error correction data associated with the client data $D1_C$. The data $Q1_D$ is error correction data associated with the client data $D1_D$.

The data $Q2_A$ is error correction data associated with the client data $D2_A$. The data $Q2_B$ is error correction data associated with the client data $D2_B$. The data $Q2_C$ is error correction data associated with the client data $D2_C$. The data $Q2_D$ is error correction data associated with the client data $D2_D$.

The data $Q3_A$ is error correction data associated with the client data $D3_A$. The data $Q3_B$ is error correction data associated with the client data $D3_B$. The data $Q3_C$ is error correction data associated with the client data $D3_C$. The data $Q3_D$ is error correction data associated with the client data $D3_D$.

The data $Q4_A$ is error correction data associated with the client data $D4_A$. The data $Q4_B$ is error correction data associated with the client data $D4_B$. The data $Q4_C$ is error correction data associated with the client data $D4_C$. The data $Q4_D$ is error correction data associated with the client data $D4_D$.

The client data stored in the subarrays 44-3 and 44-4 can be rebuilt or reconstructed based on the error correction data stored in the subarray 44-1. The client data stored in the subarrays 44-3 and 44-4 can be rebuilt or reconstructed based on the error correction data stored in the subarray 44-2. The client data stored in the subarrays 44-3 and 44-4 can be rebuilt or reconstructed based on the error correction data stored in the subarrays 44-1 and 44-2.

The first kind of error correction data (e.g., P) can be generated by the control unit 2. The first kind of error correction data can be generated by the control unit 2 based on the client data in the same subgroup. The first kind of error correction data can be generated by the control unit 2 based on the second kind of error correction data (e.g., Q) and the client data in the same subgroup.

The second kind of error correction data (e.g., Q) can be generated by the control unit 2. The second kind of error correction data can be generated by the control unit 2 based on the client data in the same subgroup. The second kind of error correction data can be generated by the control unit 2 based on the first kind of error correction data (e.g., P) and the client data in the same subgroup.

The error correction data $P1_A$ is associated with the error correction data $Q1_A$. The error correction data $P1_B$ is associated with the error correction data $Q1_B$. The error correction data $P1_C$ is associated with the error correction data $Q1_C$. The error correction data $P1_D$ is associated with the error correction data $Q1_D$.

The error correction data $P2_A$ is associated with the error correction data $Q2_A$. The error correction data $P2_B$ is associated with the error correction data $Q2_B$. The error correction data $P2_C$ is associated with the error correction data $Q2_C$. The error correction data $P2_D$ is associated with the error correction data $Q2_D$.

The error correction data $P3_A$ is associated with the error correction data $Q3_A$. The error correction data $P3_B$ is associated with the error correction data $Q3_B$. The error correction data $P3_C$ is associated with the error correction data $Q3_C$. The error correction data $P3_D$ is associated with the error correction data $Q3_D$.

The error correction data $P4_A$ is associated with the error correction data $Q4_A$. The error correction data $P4_B$ is associated with the error correction data $Q4_B$. The error correction data $P4_C$ is associated with the error correction data $Q4_C$. The error correction data $P4_D$ is associated with the error correction data $Q4_D$.

Using two types of error correction data can increase the number of failed storage units that can be tolerated within the array 44. For example, if the RAID level 6 (RAID 6) algorithm is utilized in the array, even if two storage units fail or are damaged at the same time, the data stored in these two damaged storage units can still be recovered successfully. However, one thing should be noticed that the two kinds of error correction data patterns occupy all the storage units of the subarrays 44-1 and 44-2. Only two subarrays (that is, subarrays 44-3 and 44-4) of the array 44 can be utilized to store user data. The capacity efficiency of the array 44 is merely 50%.

Figure 7A:
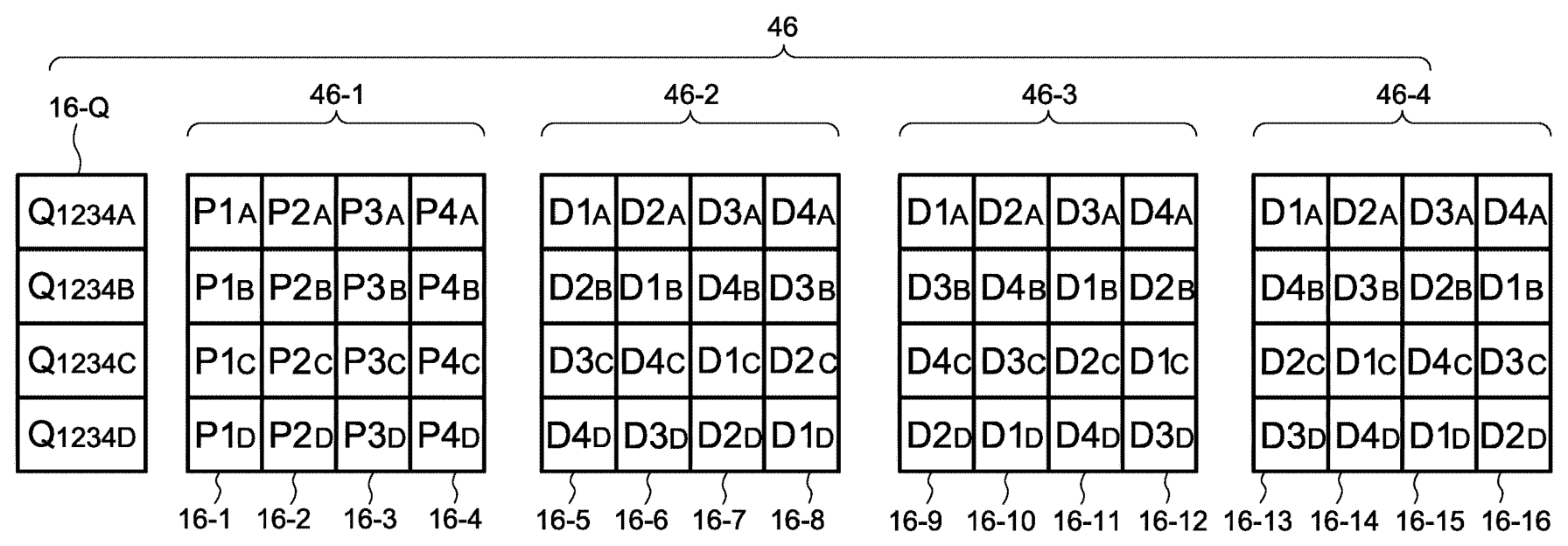

FIG. 7A is a schematic diagram illustrating data allocation portfolio according to some embodiments of the subject application. The array 46 includes 16 storage units grouped into subarrays 46-1, 46-2, 46-3 and 46-4. The data allocation portfolio for the storage units 16-1, 16-2, 16-3, 16-4, 16-5, 16-6, 16-7, 16-8, 16-9, 16-10, 16-11, 16-12, 16-13, 16-14, 16-15 and 16-16 is the same as that shown in FIG. 6, which utilizes an order four of orthogonal Latin square set. The array 46 further includes an additional storage unit 16-Q.

All of the storage units of the subarray 46-1 are used to store first kind of error correction data (that is, data $P1_A$, $P1_B$, $P1_C$, $P1_D$, $P2_A$, $P2_B$, $P2_C$, $P2_D$, $P3_A$, $P3_B$, $P3_C$, $P3_D$, $P4_A$, $P4_B$, $P4_C$ and $P4_D$). All the storage units of the subarrays 46-2, 46-3 and 46-4 are used to store user data or client data (that is, data $D1_A$, $D1_B$, $D1_C$, $D1_D$, $D2_A$, $D2_B$, $D2_C$, $D2_D$, $D3_A$, $D3_B$, $D3_C$, $D3_D$, $D4_A$, $D4_B$, $D4_C$ and $D4_D$). The storage unit 16-Q is used to store a second kind of error correction data (that is, data $Q1234_A$, $Q1234_B$, $Q1234_C$ and $Q1234_D$).

As previously discussed in accordance with FIG. 7, the data (e.g., P1, P2, P3 and P4) stored in the subarray 46-1 are error correction data associated with the client data (e.g., D1, D2, D3 and D4) stored in the subarrays 46-2, 46-3 and 46-4.

The data stored in the storage unit 16-Q are error correction data associated with the client data stored in the subarrays 46-2, 46-3 and 46-4. Referring to FIG. 7A, the error correction data pattern $Q1234_A$ is error correction data associated with the client data $D1_A$, $D2_A$, $D3_A$ and $D4_A$ stored in the subarrays 46-2, 46-3 and 46-4. The error correction data pattern $Q1234_B$ is error correction data associated with the client data $D1_B$, $D2_B$, $D3_B$ and $D4_B$ stored in the subarrays 46-2, 46-3 and 46-4. The error correction data pattern $Q1234_C$ is error correction data associated with the client data $D1_C$, $D2_C$, $D3_C$ and $D4_C$ stored in the subarrays 46-2, 46-3 and 46-4. The correction data pattern $Q1234_D$ is error correction data associated with the client data $D1_D$, $D2_D$, $D3_D$ and $D4_D$ stored in the subarrays 46-2, 46-3 and 46-4.

Figure 7B:
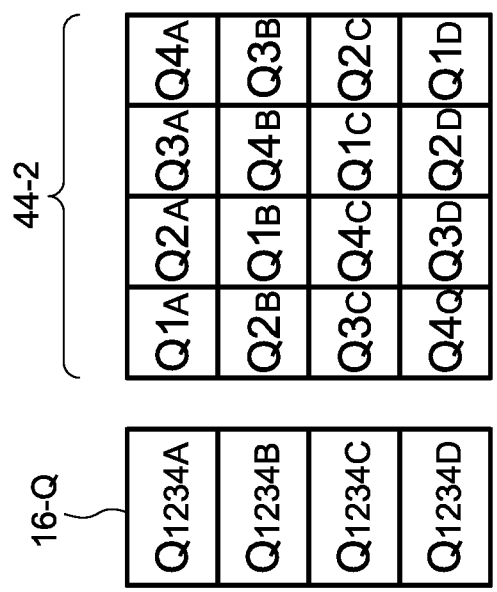
FIG. 7B is a schematic diagram illustrating a method to derive an error correction data according to some embodiments of the present disclosure.

FIG. 7B is a schematic diagram illustrating a method to derive an error correction data according to some embodiments of the present disclosure.

The error correction data $Q1234_A$ can be derived from the error correction data $Q1_A$, $Q2_A$, $Q3_A$ and $Q4_A$ of the subarray 44-2. The error correction data $Q1234_B$ can be derived from the error correction data $Q1_B$, $Q2_B$ $Q3_B$ and $Q4_B$ of the subarray 44-2. The error correction data $Q1234_C$ can be derived from the error correction data $Q1_C$, $Q2_C$ $Q3_C$ and $Q4_C$ of the subarray 44-2. The error correction data $Q1234_D$ can be derived from the error correction data $Q1_D$, $Q2_D$ $Q3_D$ and $Q4_D$ of the subarray 44-2.

The error correction data $Q1234_A$ can be derived from a logical calculation of the error correction data $Q1_A$, $Q2_A Q3_A$ and $Q4_A$. The error correction data $Q1234_B$ can be derived from a logical calculation of the error correction data $Q1_B$, $Q2_B$ $Q3_B$ and $Q4_B$. The error correction data $Q1234_C$ can be derived from a logical calculation of the error correction data $Q1_C$, $Q2_C$ $Q3_C$ and $Q4_C$ of the subarray 44-2. The error correction data $Q1234_D$ can be derived from a logical calculation of the error correction data $Q1_D$, $Q2_D Q3_D$ and $Q4_D$.

The logical calculation utilized to generate the error correction data $Q1234_A$, $Q1234_B$, $Q1234_C$ and $Q1234_D$ includes but not limited to an "exclusive or" calculation. It can be contemplated that other logical calculation may be utilized in deriving Q1234 from Q1, Q2, Q3 and Q4.

Using the data allocation mechanism shown in FIG. 7A, the capacity efficiency of the array 46 is increased as compared to that of the array 44 shown in FIG. 7. Specifically, the capacity efficiency of FIG. 7A is 70.5% (that is, 12 storage units out of total 17 storage units are utilized fir storing user data). Using the data allocation mechanism shown in FIG. 7A, the speed of data reconstruction process can be increased up to four times in the condition that only one storage unit fails or is damaged. Additionally, since the array 46 includes two kinds of error correction data patterns, the array 46 can tolerate two storage units failures.

Figure 8A:
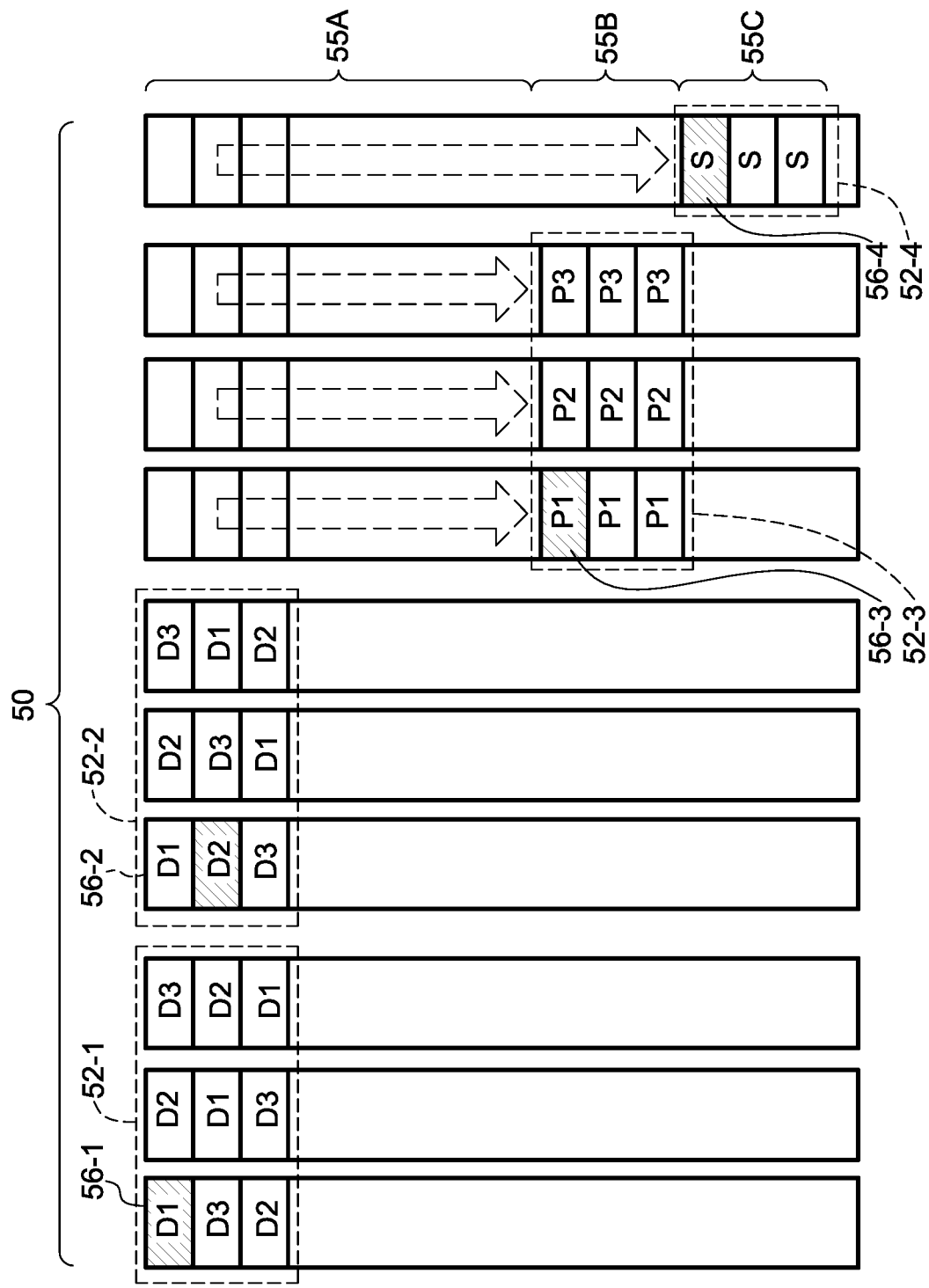
FIG. 8A is a schematic diagram illustrating a storage space configuration according to some embodiments of the subject application.

FIG. 5A is a schematic diagram illustrating a storage space configuration according to some embodiments of the subject application. FIG. 8A shows an array 50 including 10 storage units. Each of the storage units includes three storage partitions 55A, 55B and 55C. Each of the storage partitions 55A, 559 and 55C includes a plurality of storage regions. In some embodiments, the storage regions within each of the storage partitions 55A, 55B and 55C are logically consecutive. In some embodiments, the storage regions within each of the storage partitions 55A, 559 and 55C are physically consecutive.

The storage partition 55A of each of the storage units is designated to store user data or client data. The storage partition 55B of each of the storage units is designated to store error correction data or parity data. The storage partition 55C of each of the storage units is a spare partition that will be used in the data reconstruction process to store rebuilt data.

The data to be stored in the array 50 are arranged in a specific manner. As shown in FIG. 8A, the data to be stored in the subarrays 52-1, 52-2 and 52-3 follows the same manner as previously illustrated in accordance with FIG. 4. That is, the data in the subarrays 52-1, 52-2 and 52-3 are allocated based on an order three of orthogonal Latin square set. It can be contemplated that the data in the subarrays 52-1, 52-2 and 52-3 can be allocated based on orthogonal Latin square set of different orders.

The subarrays 52-1 and 52-2 that store user data are allocated in the storage partitions 55A among several storage units. The subarray 52-3 that store error correction data or parity data is allocated in the storage partitions 55B among several storage units. The subarray 52-4 includes three spare storage regions that can be used to store rebuilt data is allocated in the storage partitions 55C of a storage unit. For example, the data 56-1 of the subarray 52-1 can be rebuilt according to the data 56-2 of the subarray 52-2 and the data 56-3 of the subarray 52-3. The rebuilt version of the data 56-1 will be stored in the spare storage region 56-4 of the subarray 52-4.

Figure 8B:
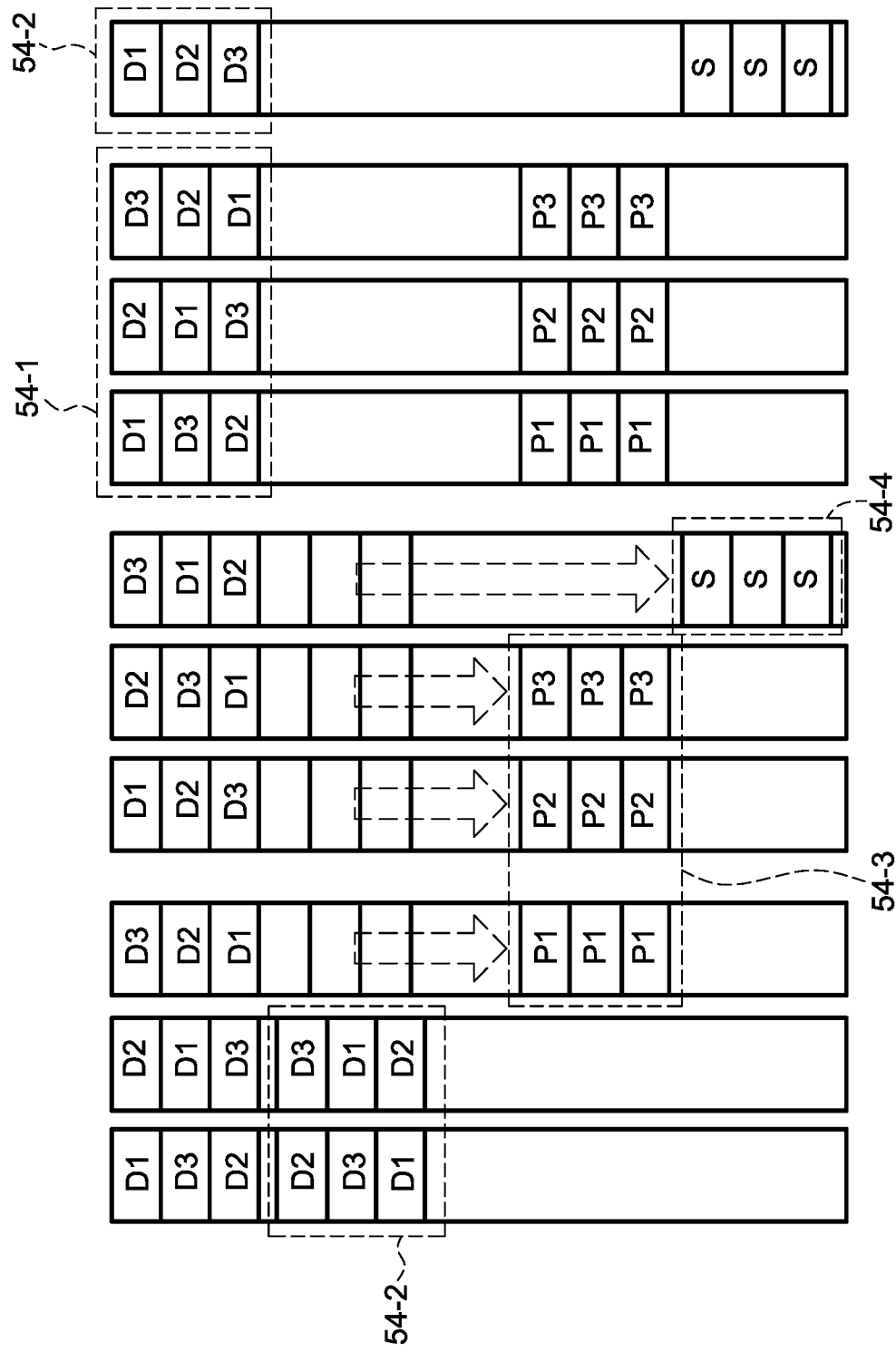
FIG. 8B is a schematic diagram illustrating a storage space configuration according to some embodiments of the subject application.

FIG. 8B is a schematic diagram illustrating a storage space configuration according to some embodiments of the subject application. FIG. 8B shows a manner how a second group of subarrays 54-1, 54-2, 54-3 and 54-4 is allocated in the array 50. The subarray 54-1 is allocated in the storage units adjacent to those for store the subarray 52-2, and the subarray 54-2 is allocated starting from the storage unit adjacent to those for store the subarray 54-1. The subarray 54-3 for storing the error correction data patterns is allocated in the storage partition 55B among the storage units adjacent to those for store the subarray 54-2. The subarray 54-4 is allocated in a storage unit adjacent to those for store the subarray 54-3.

FIG. 8C is a schematic diagram illustrating a storage space configuration according to some embodiments of the subject application. FIG. 8C shows a data allocation portfolio using the data allocation mechanism as illustrated in accordance with in FIGS. 8A and 8B. The user data is allocated in the storage partition 55A of each of the storage units, the error correction data patterns are allocated in the storage partition 55B of each of the storage units, and the spare storage regions are allocated in the storage partition 55C of each of the storage units.

As previously mentioned, the data reconstruction process includes a step of writing the rebuilt data back to the failed storage unit. The rebuilt data in FIG. 8C is spread over each of the storage units, and thus each of the storage units can provide the rebuilt data simultaneously in the step of writing the rebuilt data back to the failed storage unit. By spreading the spare storage regions to each of the storage units rather than allocating spare storage regions in merely one storage unit (for example, a legacy data allocation mechanism allocates all the spare storage regions in only one storage unit), the speed of data reconstruction process can be further increased by multiple times.

As used herein, the singular terms "a," "an," and "the" may include plural referents unless the context clearly dictates otherwise. In the description of some embodiments, a component provided "on," "above," or "over" another component can encompass cases where the former component is directly on (e.g., in physical contact with) the latter component, as well as cases where one or more intervening components are located between the former component and the latter component.

As used herein, the terms "substantially," "approximately," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to +10% of that numerical value, such as less than or equal to +5%, less than or equal to +4%, less than or equal to ±3%, less than or equal to ±2%, less than or equal to ±1%, less than or equal to ±0.5%, less than or equal to ±0.1%, or less than or equal to ±0.05%. For example, the term "about" or "substantially" equal in reference to two values can refer to a ratio of the two values being within a range between and inclusive of 0.9 and 1.1.

Additionally, amounts, ratios, and other numerical values are sometimes presented herein in a range format. It is to be understood that such a range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure, as defined by the appended claims. The illustrations may not be necessarily drawn to scale. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An apparatus, comprising:
a control unit;
a memory coupled to the control unit and including computer program code;
N groups of storage units electrically connected to the control unit, each of the N groups of storage units having N storage units, each of the N storage units having N storage regions, wherein N is a positive integer;
wherein the memory and the computer program code configured to, with the control unit, cause the apparatus to perform:
rebuilding a first data segment stored in an $i^{th}$ storage region of a first storage unit of a $k^{th}$ group of storage units according to only one storage unit of a $(k+1)^{th}$ group of storage units and only one storage unit of a $(k+2)^{th}$ group of storage units;
rebuilding a second data segment stored in an $(i+1)^{th}$ storage region of the first storage unit of the $k^{th}$ group of storage units according to only one storage unit of the $(k+1)^{th}$ group of storage units and only one storage unit of the $(k+2)^{th}$ group of storage units;
wherein
i is a positive integer less than or equal to N, where k is a positive integer less than or equal to N,
the first data segment and the second data segment are rebuilt according to two different storage units of the $(k+1)^{th}$ group of storage units, and
the first data segment and the second data segment are rebuilt according to two different storage units of the $(k+2)^{th}$ group of storage units.

2. The apparatus of claim 1, further comprising:
rebuilding a third data segment stored in an $(i+2)^{th}$ storage region of the first storage unit of the $k^{th}$ group of storage units according to only one storage unit of the $(k+1)^{th}$ group of storage units and only one storage unit of the $(k+2)^{th}$ group of storage units.

3. The apparatus of claim 2, wherein the third data segment and the first data segment are rebuilt according to two different storage units of the $(k+1)^{th}$ group of storage units, and wherein the third data segment and the first data segment are rebuilt according to two different storage units of the $(k+2)^{th}$ group of storage units.

4. The apparatus of claim 2, wherein the third data segment and the second data segment are rebuilt according to two different storage units of the $(k+1)^{th}$ group of storage units, and wherein the third data segment and the second data segment are rebuilt according to two different storage units of the $(k+2)^{th}$ group of storage units.

5. The apparatus of claim 1, further comprising:
rebuilding a fourth data segment stored in an $i^{th}$ storage region of a second storage unit of the $k^{th}$ group of storage units according to only one storage unit of the $(k+1)^{th}$ group of storage units and only one storage unit of the $(k+2)^{th}$ group of storage units.

6. The apparatus of claim 5, further comprising an additional storage unit electrically connected to the control unit, the additional storage unit having N storage regions, the apparatus further comprising:
storing a seventh data segment into an $i^{th}$ storage region of the additional storage unit, wherein the fourth data segment and the first data segment are rebuilt according to the seventh data segment.

7. The apparatus of claim 6, wherein the seventh data segment includes error correction data associated with the first data segment and the fourth data segment.

8. The apparatus of claim 5, wherein the fourth data segment and the first data segment are rebuilt according to two different storage units of the $(k+1)^{th}$ group of storage units, and wherein the fourth data segment and the first data segment are rebuilt according to two different storage units of the $(k+2)^{th}$ group of storage units.

9. The apparatus of claim 5, further comprising:
rebuilding a fifth data segment stored in an $(i+1)^{th}$ storage region of the second storage unit of the $k^{th}$ group of storage units according to only one storage unit of the $(k+1)^{th}$ group of storage units and only one storage unit of the $(k+2)^{th}$ group of storage units.

10. The apparatus of claim 9, wherein the fifth data segment and the second data segment are rebuilt according to two different storage units of the $(k+1)^{th}$ group of storage units, and wherein the fifth data segment and the second data segment are rebuilt according to two different storage units of the $(k+2)^{th}$ group of storage units.

11. The apparatus of claim 9, wherein the fifth data segment and the fourth data segment are rebuilt according to two different storage units of the $(k+1)^{th}$ group of storage units, and wherein the fifth data segment and the fourth data segment are rebuilt according to two different storage units of the $(k+2)^{th}$ group of storage units.

12. The apparatus of claim 9, further comprising:
rebuilding a sixth data segment stored in an $i^{th}$ storage region of a third storage unit of the $k^{th}$ group of storage units according to only one storage unit of the $(k+1)^{th}$ group of storage units and only one storage unit of the $(k+2)^{th}$ group of storage units.

13. The apparatus of claim 12, wherein the sixth data segment and the first data segment are rebuilt according to two different storage units of the $(k+1)^{th}$ group of storage units, and wherein the sixth data segment and the first data segment are rebuilt according to two different storage units of the $(k+2)^{th}$ group of storage units.

14. The apparatus of claim 12, wherein the sixth data segment and the fourth data segment are rebuilt according to two different storage units of the $(k+1)^{th}$ group of storage units, and wherein the sixth data segment and the fourth data segment are rebuilt according to two different storage units of the $(k+2)^{th}$ group of storage units.

15. An apparatus, comprising:
    a control unit;
    a memory coupled to the control unit and including computer program code;
    S group of storage units electrically connected to the control unit, a $1^{st}$ group of storage units to a $(S-1)^{th}$ group of storage units each having N storage units, the $S^{th}$ group of storage units having M storage units, each storage units of the S group of storage units having N storage regions, wherein N, S and M are positive integers and S and M are less than N;
    wherein the memory and the computer program code configured to, with the control unit, cause the apparatus to perform:
    rebuilding a first data segment stored in an $i^{th}$ storage region of a first storage unit of a $k^{th}$ group of storage units according to only one storage unit of a $(k+1)^{th}$ group of storage units and only one storage unit of the $S^{th}$ group of storage units;
    rebuilding a second data segment stored in an $(i+2)^{th}$ storage region of the first storage unit of the $k^{th}$ group of storage units according to only one storage unit of the $(k+1)^{th}$ group of storage units and only one storage unit of the $S^{th}$ group of storage units;
    wherein
    i is a positive integer less than or equal to N, where k is a positive integer less than or equal to N,
    the first data segment and the second data segment are rebuilt according to two different storage units of the $(k+1)^{th}$ group of storage units, and
    the first data segment and the second data segment are rebuilt according to two different storage units of the $S^{th}$ group of storage units.

16. The apparatus of claim 15, further comprising:
    rebuilding a third data segment stored in an $i^{th}$ storage region of a second storage unit of the $k^{th}$ group of storage units according to only one storage unit of the $(k+1)^{th}$ group of storage units and only one storage unit of the $S^{th}$ group of storage units.

17. The apparatus of claim 16, wherein the third data segment and the first data segment are rebuilt according to two different storage units of the $(k+1)^{th}$ group of storage units, and wherein the third data segment and the first data segment are rebuilt according to two different storage units of the $S^{th}$ group of storage units.

18. The apparatus of claim 16, further comprising:
    rebuilding a fourth data segment stored in an $(i+2)^{th}$ storage region of the second storage unit of the $k^{th}$ group of storage units according to only one storage unit of the $(k+1)^{th}$ group of storage units and only one storage unit of the $S^{th}$ group of storage units.

19. The apparatus of claim 18, wherein the fourth data segment and the second data segment are rebuilt according to two different storage units of the $(k+1)^{th}$ group of storage units, and wherein the fourth data segment and the second data segment are rebuilt according to two different storage units of the $S^{th}$ group of storage units.

20. A method for rebuilding data in a storage system having N groups of storage units each having N storage units, each storage unit of the N group of storage units having N storage regions, wherein N is a positive integer, the method comprising:
    rebuilding a first data segment stored in an $i^{th}$ storage region of a first storage unit of a $k^{th}$ group of storage units according to only one storage unit of a $(k+1)^{th}$ group of storage units and only one storage unit of a $(k+2)^{th}$ group of storage units;
    rebuilding a second data segment stored in an $(i+1)^{th}$ storage region of the first storage unit of the $k^{th}$ group of storage units according to only one storage unit of the $(k+1)^{th}$ group of storage units and only one storage unit of the $(k+2)^{th}$ group of storage units;
    wherein
    i is a positive integer less than or equal to N, where k is a positive integer less than or equal to N,
    the first data segment and the second data segment are rebuilt according to two different storage units of the $(k+1)^{th}$ group of storage units, and
    the first data segment and the second data segment are rebuilt according to two different storage units of the $(k+2)^{th}$ group of storage units.

21. The method of claim 20, further comprising:
    rebuilding a third data segment stored in an $i^{th}$ storage region of a second storage unit of the $k^{th}$ group of storage units according to only one storage unit of the $(k+1)^{th}$ group of storage units and only one storage unit of the $(k+2)^{th}$ group of storage units.

22. The method of claim 21, wherein the third data segment and the first data segment are rebuilt according to two different storage units of the $(k+1)^{th}$ group of storage units, and wherein the third data segment and the first data segment are rebuilt according to two different storage units of the $(k+2)^{th}$ group of storage units.

* * * * *